US011190971B2

(12) United States Patent
Zhao et al.

(10) Patent No.: US 11,190,971 B2
(45) Date of Patent: Nov. 30, 2021

(54) UE ASSISTANCE APPLICATION DETECTION AND POLICY CONTROL IN QOS DEPLOYMENT

(71) Applicant: Apple Inc., Cupertino, CA (US)

(72) Inventors: Yingjie Zhao, Pleasanton, CA (US); Li Su, San Jose, CA (US); Wenping Lou, San Jose, CA (US); Faraz Faheem, Santa Clara, CA (US); Jianxiong Shi, Dublin, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 16/686,291

(22) Filed: Nov. 18, 2019

(65) Prior Publication Data

US 2020/0275304 A1     Aug. 27, 2020

Related U.S. Application Data

(60) Provisional application No. 62/809,392, filed on Feb. 22, 2019, provisional application No. 62/833,236, filed on Apr. 12, 2019.

(51) Int. Cl.
*H04W 28/02* (2009.01)
*H04W 28/24* (2009.01)
*H04W 28/12* (2009.01)

(52) U.S. Cl.
CPC ....... *H04W 28/0268* (2013.01); *H04W 28/12* (2013.01); *H04W 28/24* (2013.01)

(58) Field of Classification Search
CPC . H04W 28/0268; H04W 28/12; H04W 28/24; H04W 28/0263; H04W 47/26; H04W 47/33; H04W 76/22; H04W 76/12
See application file for complete search history.

(56) References Cited

U.S. PATENT DOCUMENTS

| 8,060,017 B2 | 11/2011 | Schlicht |
| 9,838,934 B2 | 12/2017 | Zhou |
| 10,148,561 B2 | 12/2018 | Cui |

(Continued)

OTHER PUBLICATIONS

Braden, Ed., et al., "Resource Reservation Protocol (RSVP)—Version 1 Functional Specification", RFC 2205, Sep. 1997; 112 pages.

(Continued)

*Primary Examiner* — Mewale A Ambaye
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment (UE) device to adaptively provide enhanced the quality of service (QoS) for an application. The UE may request a dedicated bearer or flow for communications conducted over a network between a UE application and a server associated with the application. The UE may use various information, including a QoS profile associated with the application, to determine requested QoS parameters and/or determine whether to provide the enhanced QoS functionality, e.g., whether to request the dedicated bearer/flow from the network. These techniques may tend to provide more appropriate QoS to the application, which may improve user experience.

20 Claims, 16 Drawing Sheets

(56) References Cited

U.S. PATENT DOCUMENTS

| | | | |
|---|---|---|---|
| 2006/0286993 A1 | 12/2006 | Xie | |
| 2009/0300207 A1 | 12/2009 | Giaretta | |
| 2012/0198081 A1* | 8/2012 | Zhao | H04L 47/767 709/227 |
| 2014/0119178 A1* | 5/2014 | Zhao | H04W 28/0263 370/230 |
| 2019/0045421 A1 | 2/2019 | Shah | |
| 2019/0053215 A1 | 2/2019 | Yu | |
| 2019/0274064 A1 | 9/2019 | Chapman | |
| 2019/0319858 A1 | 10/2019 | Das | |
| 2019/0320479 A1* | 10/2019 | Choudhary | H04L 69/14 |
| 2019/0342800 A1* | 11/2019 | Sirotkin | H04B 17/318 |

OTHER PUBLICATIONS

Wroclawski, J., "The Use of RSVP with IETF Integrated Services", RFC 2210, Sep. 1997; 33 pages.

\* cited by examiner

Information element {

2 Bytes: Length

2 Bytes: Type

Variable Length: Data

Padding (if necessary)

| Type | Value | Description |
|---|---|---|
| Application Info | 0 | Application related info |
| IPv4 TFT | 1 | TFT of IPv4 |
| IPv6 TFT | 2 | TFT of IPv6 |
| Service Quality | 3 | Measure or request service quality |

FIG. 10

Application Info {

2 Byte: Length

16 Bytes: Service provider ID

16 Byte: Application ID

1 Byte: Length

Variable Length: Application user account

IPv4 TFT {

2 Byte: Length

2 Byte: Protocol n x12 Bytes: Packet filter list

Packet Filter {

4 Bytes: Source IP address

2 Bytes: Source Port

4 Bytes: Destination IP address

2 Bytes: Destination port

IPv6 TFT {

2 Byte: Length

2 Byte: Protocol n x36 Bytes: Packet filter list

Packet Filter {

16 Bytes: Source IP address

2 Bytes: Source Port

16 Bytes: Destination IP address

2 Bytes: Destination port

```
Service Quality {

2 Byte: Length

2 Byte: Operation (0-Request, 1-report)l

2 Byte: Latency in ms

2 Byte: Jitter in ms

2 Byte: Error rate (%)

4 Bytes: Future use (reserved, set all 0 now)

}
```

UE ASSISTANCE APPLICATION DETECTION AND POLICY CONTROL IN QOS DEPLOYMENT

PRIORITY CLAIM

This application claims priority to U.S. provisional patent application Ser. No. 62/833,236, entitled "UE Assistance Application Detection and Policy Control in QoS Deployment," filed Apr. 12, 2019 and to U.S. provisional patent application Ser. No. 62/809,392, entitled "UE Assistance Application Detection and Policy Control in QoS Deployment," filed Feb. 22, 2019, each of which is hereby incorporated by reference in its entirety as though fully and completely set forth herein.

TECHNICAL FIELD

The present application relates to wireless devices, and more particularly to an apparatus, system, and method for enhancing the quality of service (QoS) of wireless communications for one or more applications executing on a user equipment device (UE).

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, an application on a UE device may perform a process that demands a certain level of service quality, or quality of service (QoS), for related wireless communications. For example, the UE may host a latency-sensitive application that may be particularly sensitive to delays in application-related communications, and that may benefit from a certain QoS configuration. However, in some cases, the UE (or application) may lack flexibility in determining and adjusting the QoS configuration of application-specific communications conducted over a wireless network. Low or otherwise inadequate QoS of communications performed for some applications may lead to poor user experience, or poor quality of experience (QoE). Thus, improvements in the field are desirable.

SUMMARY

Techniques are disclosed for a user equipment (UE) device that may desire an enhanced quality of service (QoS) for certain wireless communications associated with an application executing on the UE. The UE may comprise at least one antenna for performing wireless communications, a radio coupled to the at least one antenna, and a processing element coupled to the radio, and may be configured to communicate in a wireless fashion with a wireless (e.g., cellular) network via at least one type of radio access technology (RAT).

The application executing on the UE may operate in conjunction with a remote server that provides content (e.g., data) for use in the application. More generally, the application may exchange (uplink and/or downlink) data with a server associated with the application (e.g., an application server). The application executing on the UE may have one or more QoS requirements that may not be adequately met by typical network service. For example, the application may be a latency-sensitive application that performs latency-sensitive wireless communications, and may require or benefit from a certain level of QoS or a certain QoS configuration for certain communications. For example, the application may be an online or real-time or multi-player game application, a video chat or video conferencing application, a streaming audio or video application, a short video application, etc. The performance of the application may, in some circumstances, demand or benefit from wireless communications between the server and the UE that are low-latency to a certain degree. A default bearer or flow (or multiple bearers, flows, or other means of serving the application traffic) may not provide the required (or desired) QoS for data exchanged with the application server.

According to some embodiments, the UE may establish a dedicated, end-to-end "pipeline" (e.g., bearer or flow) with the network for conducting traffic between the application executing on the UE and a server associated with the application, e.g., an application server. The UE may determine whether the application is eligible for an enhanced quality of service (QoS) configuration of the bearer/flow of the traffic, e.g., the application traffic. The UE may use various means to determine requested QoS configuration parameters and/or to determine whether the application is eligible for an enhanced QoS configuration.

The UE may transmit a request to the network for a dedicated bearer or enhanced QoS flow for the application traffic. The UE may indicate requested QoS configuration parameters and other parameters for the bearer/flow. For example, the UE may transmit a traffic flow template.

The UE may use an extended Resource ReSerVation Protocol (RSVP) to communicate about the request and associated parameters with the network. The extension of RSVP may be referred to as "Mobile RSVP". Other protocols may be used such as HyperText Transfer Protocol (HTTP), HTTP Secure (HTTPs), and/or stream control transfer protocol (SCTP).

In response to the request, the network may establish a dedicated bearer or flow with the desired QoS configuration to serve the application traffic between the UE and the application server. It will be appreciated that the bearer/flow may be an end-to-end bearer/flow, e.g., including any number of links. For example, the end-to-end bearer/flow may include one or more links such as: between the UE and a base station, a base station and any number of intermediate network elements, and the network elements to the application server. The UE and the application server may then exchange data via the dedicated bearer/flow according to the enhanced QoS configuration.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIGS. 7-15 provide additional detail about exemplary embodiments of the method of FIG. 6;

Figure 1:
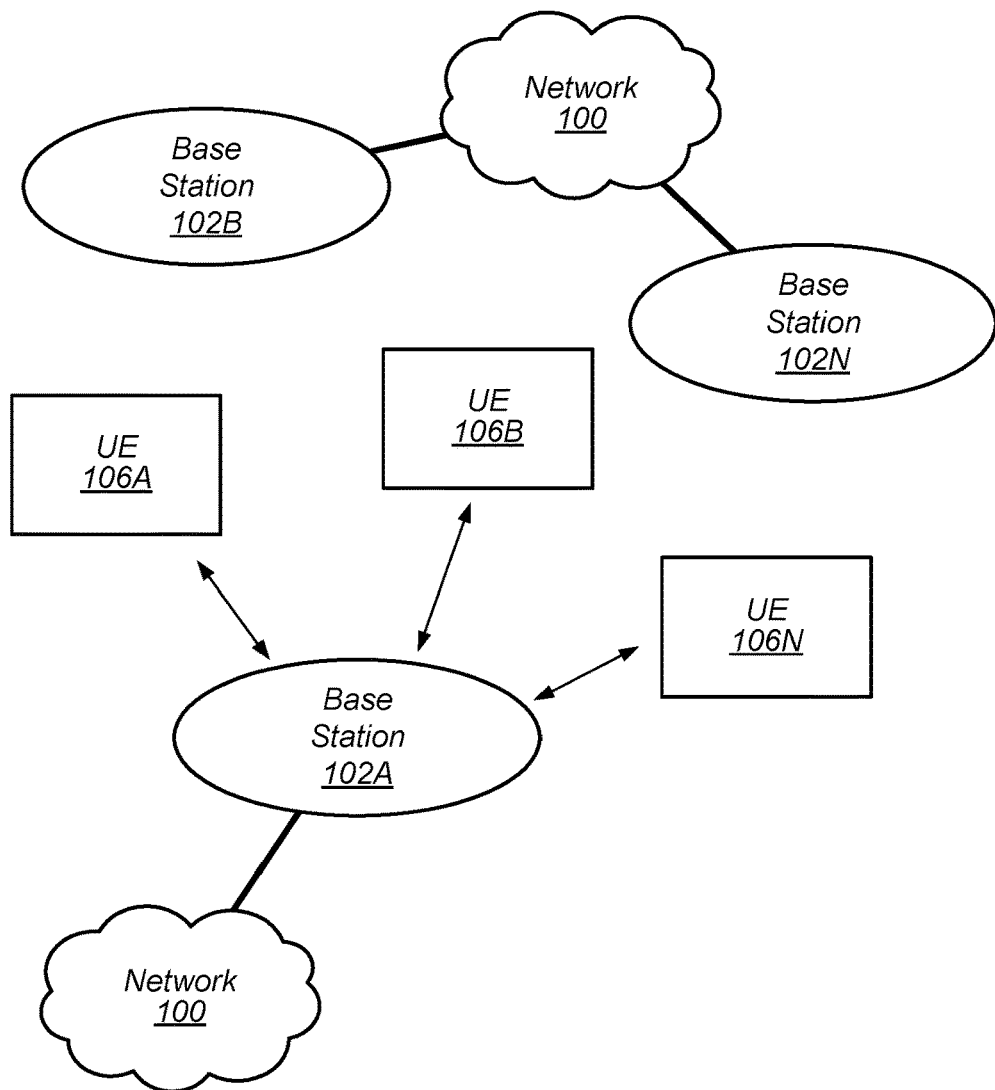
FIG. 1 illustrates a simplified example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
 UE: User Equipment
 BS: Base Station
 ENB: eNodeB (Base Station)
 LTE: Long Term Evolution
 UMTS: Universal Mobile Telecommunications System
 RAT: Radio Access Technology
 RAN: Radio Access Network
 E-UTRAN: Evolved UMTS Terrestrial RAN
 CN: Core Network
 EPC: Evolved Packet Core
 MME: Mobile Management Entity
 HSS: Home Subscriber Server
 SGW: Serving Gateway
 PS: Packet-Switched
 CS: Circuit-Switched
 EPS: Evolved Packet-Switched System
 RRC: Radio Resource Control
 IE: Information Element
 QoS: Quality of Service
 QoE: Quality of Experience
 TFT: Traffic Flow Template
 RSVP: Resource ReSerVation Protocol
 API: Application programming interface
 NEF: Network exposure Function
 UPF: User plane function
 SCEF: Service capability exposure function
 AES: Application entitlement server Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
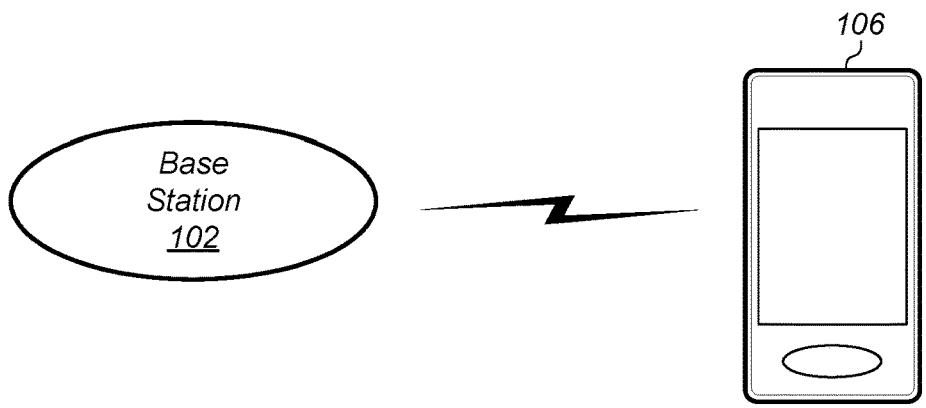
FIG. 2 illustrates a base station in communication with user equipment (UE), according to some embodiments.

FIGS. 1 and 2—Communication System

FIG. 1 illustrates a simplified example wireless cellular communication system. It is noted that the system of FIG. 1 is merely one example of a possible cellular communication system, and embodiments may be implemented in various systems.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100.

The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, New Radio (NR), and any of various 3G, 4G, 5G or future telecom standards. One or more base stations 102 implementing RATs may comprise a radio access network (RAN).

Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

FIG. 2 illustrates user equipment (UE) 106 (e.g., one of the devices 106A through 106N) in communication with the base station 102. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The UE may include a processing element such as one or more of a processor, an ASIC (application specific integrated circuit), an FPGA (field-programmable gate array) or some combination thereof. The UE, e.g., the processing element in the UE, may perform any of the methods described herein as being performed by a UE.

In some embodiments, the UE 106 may be configured to communicate using any of one or more wireless communication protocols as described above. The UE 106 may include one or more antennas for communicating using one or more wireless communication protocols. The UE may be associated with, e.g., subscribe to, a cellular carrier. Examples of cellular carries in the United States include Verizon, AT&T, Sprint, and T-Mobile.

Figure 3:
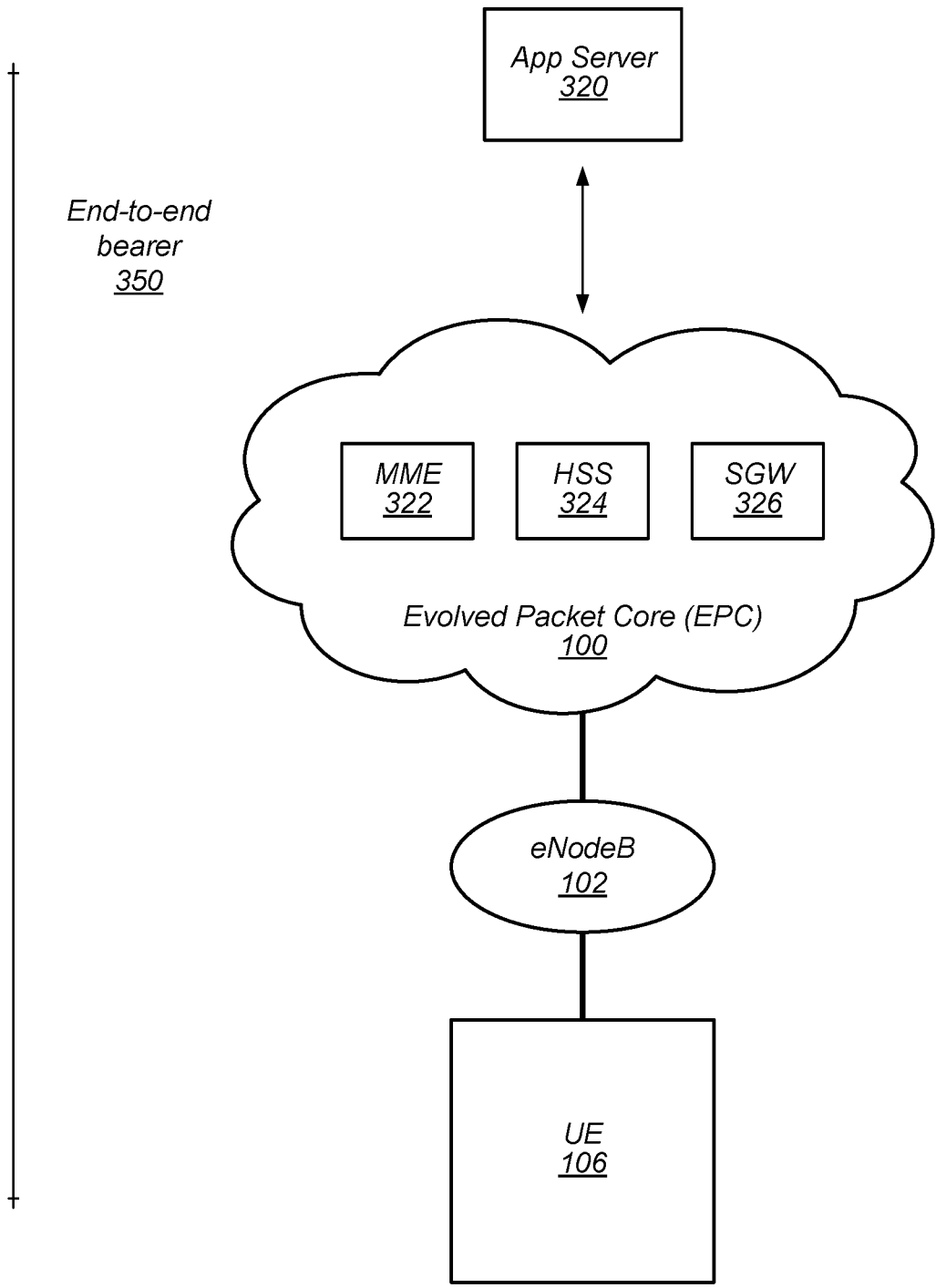
FIG. 3 illustrates an example cellular network system, according to some embodiments.

FIG. 3—Wireless Communication System

FIG. 3 illustrates an example simplified portion of a wireless communication system. The UE 106 may be in communication with a wireless network, e.g., a radio access network (RAN), which may include one or more base stations 102 and may provide connection to a core network (CN), such as an evolved packet core (EPC) 100, as shown. The base station in this example embodiment is shown as an eNodeB 102, however it will be appreciated that the base station may be a gNB (e.g., a 5G or NR base station) or other type of base station. The UE 106 may communicate in a wireless manner with the base station (eNodeB) 102. In turn, the base station 102 may be coupled to a core network, shown in this example embodiment as an evolved packet core (EPC) 100. It will be appreciated theat the core network may operate according to 5G and/or LTE, e.g., among various possible wireless standards. As shown, the EPC 100 may include a mobility management entity (MME) 322, a home subscriber server (HSS) 324, and a serving gateway (SGW) 326. The EPC 100 may also include various other devices known to those skilled in the art.

Operations described herein as being performed by the cellular network may be performed by one or more of the network devices shown in FIG. 3, such as one or more of the base station 102 or the EPC 100, and/or the MME 322, HSS 324, or SGW 326 in the EPC 100, among other possible devices. Operations described herein as being performed by the radio access network (RAN) may be performed, for example, by the base station 102, or by other components of the RAN usable to connect the UE and the CN.

As shown, a server 320 may be coupled to the network, e.g., to the core network or EPC 100. The server 320 may be configured to provide (send and/or receive) data (or content) through the network 100 and the base station 102 to an application executing on a UE 106 to facilitate the execution of the application. Thus, the server may sometimes be referred to as the application server (or app server). For example, where the application executing on the UE 106 is an online game, the application may be configured to connect to the server 320 during execution of the game, e.g., to receive and display content from the server 320 and provide user input to the server 320. During execution of the application on the UE 106, it may be desirable to have at least a certain quality of service (QoS) on the connection (e.g., end-to-end bearer 350) between the application (e.g., at the UE 106) and the server 320, so that the user of the application has a good quality of experience in terms of interacting with the application. The end-to-end bearer 350 (e.g., a pipeline) may include any number of intermediate, constituent connections. For example, the end-to-end bearer may include connections from the UE 106 to a base station 102 and from the base station 102 through any number of network elements (e.g., of EPC 100) to an application server 320. For example, the end-to-end bearer may include a wireless link from the UE to the base station, a wired link from the base station to a first core network element, a second wired link to a second element which may or may not be part of the core network (e.g., and further links to any number of further intermediate elements), and a wired link to app server 320. In some embodiments, the end-to-end bearer may include one or more connections facilitated by the network to (e.g., and/or through) servers or other elements owned or operated by third parties. Various connections that make up the end-to-end bearer 350 may each include specific QoS characteristics. For some of the connections, the QoS characteristics may be indicated by QoS class indicator (QCI). For example, a connection (or bearer) between the UE 106 and the base station 102 may be configured with a first QCI. Other connections (e.g., between the base station 102 and the EPC 100, within the EPC 100, and between the EPC 100 and the app server 320) may have corresponding QoS characteristics. Thus, the QoS characteristics of the entire end-to-end bearer 350 may be based on the QoS characteristics of the constituent connections. In other words, the quality of experience (QoE) of the user may be limited by the QoS characteristics of any constituent connection. According to the methods disclosed herein, any or all of the constituent connections may be configured so that the entire end-to-end bearer 350 provides the desired QoS characteristics. In other words, one or more constituent connections (e.g., potentially each constituent connection) may be configured so that a target QoE may be achieved, according to some embodiments.

Figure 4:
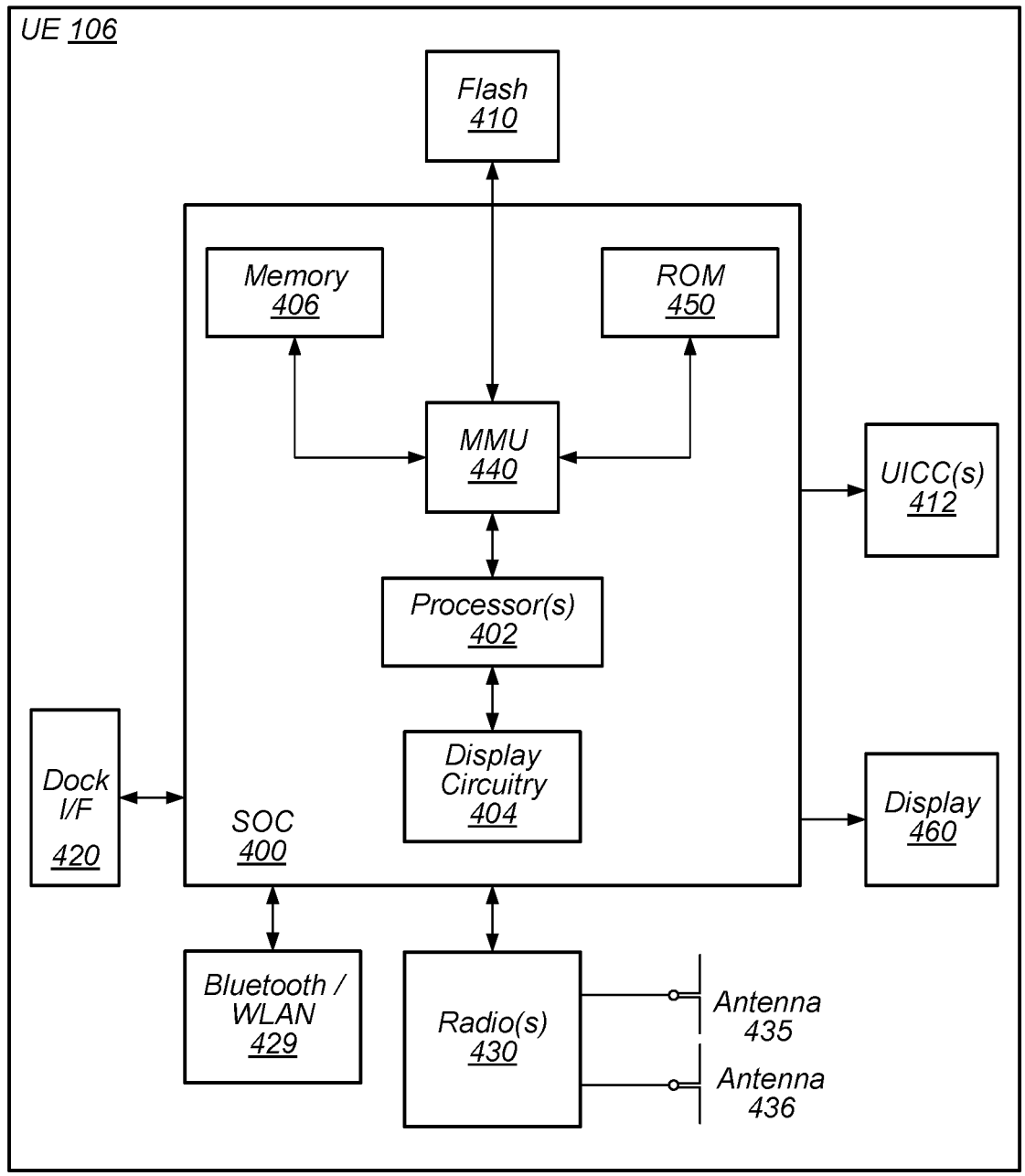
FIG. 4 is an example block diagram of a UE, according to some embodiments.

FIG. 4—Example Block Diagram of a UE

FIG. 4 is an example block diagram of a UE 106. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 440. The processor(s) 402 may also be coupled to memory management unit (MMU) 440, which may be configured to receive addresses from the processor(s) 402 and translate those addresses to locations in memory (e.g., memory 406, read-only memory (ROM) 450, NAND flash memory 410) and/or to other circuits or devices, such as the display circuitry 404, radio(s) 430, connector I/F 420, and/or display 440. The MMU 440 may be configured to perform memory protection and page table translation or setup. In some embodiments, the MMU 440 may be included as a portion of the processor(s) 402.

In the embodiment shown, ROM 450 may include a bootloader, which may be executed by the processor(s) 402 during boot-up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 440, and wireless communication circuitry (e.g., for NR, LTE, LTE-A, CDMA2000, GSM, Bluetooth, Wi-Fi, etc.). Such wireless communication circuitry may be included in the radio 430 and/or may be in addition to the radio(s) 430. For example, in the illustrated example, the UE may include wireless communication circuitry 429 for Bluetooth and/or WLAN. Similarly, the UE may include one or more baseband processors (or other processors associated with wireless communication circuitry) configured for causing the UE to implement some or all of the methods disclosed herein.

The UE 106 may include at least one antenna, and in, some embodiments, multiple antennas, for performing wireless (e.g., cellular) communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include one or more processor or processing element, e.g., hardware and/or software components, for implementing methods according to embodiments of this disclosure.

A processing element of the UE device 106, e.g., the processor 402, may be configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

The UE 106 may store and/or execute various types of application software, e.g., applications or apps. As used herein, an application or app may be one of various software programs stored on and/or executed by the UE that performs coordinated functions, tasks, or activities. Applications, or apps, may include system software programs, mobile apps, game applications, or various other software on the UE.

Some applications executed on the UE may perform wireless communications. These may include applications that provide messaging, email, browsing, video streaming, voice streaming, short video, real-time or online gaming, or various other online services or services that perform wireless communication with a network. As detailed further below, some applications that perform wireless communications may have quality of service (QoS) requirements for certain communications. For example, a latency-sensitive app on the UE may desire a high level of QoS, or high QoS, for certain app-related communications conducted over a network, e.g., potentially to and/or from an app server 320. Embodiments detailed further below relate to devices and methods for achieving enhanced QoS for UE applications that perform wireless communications with QoS requirements.

Figure 5:
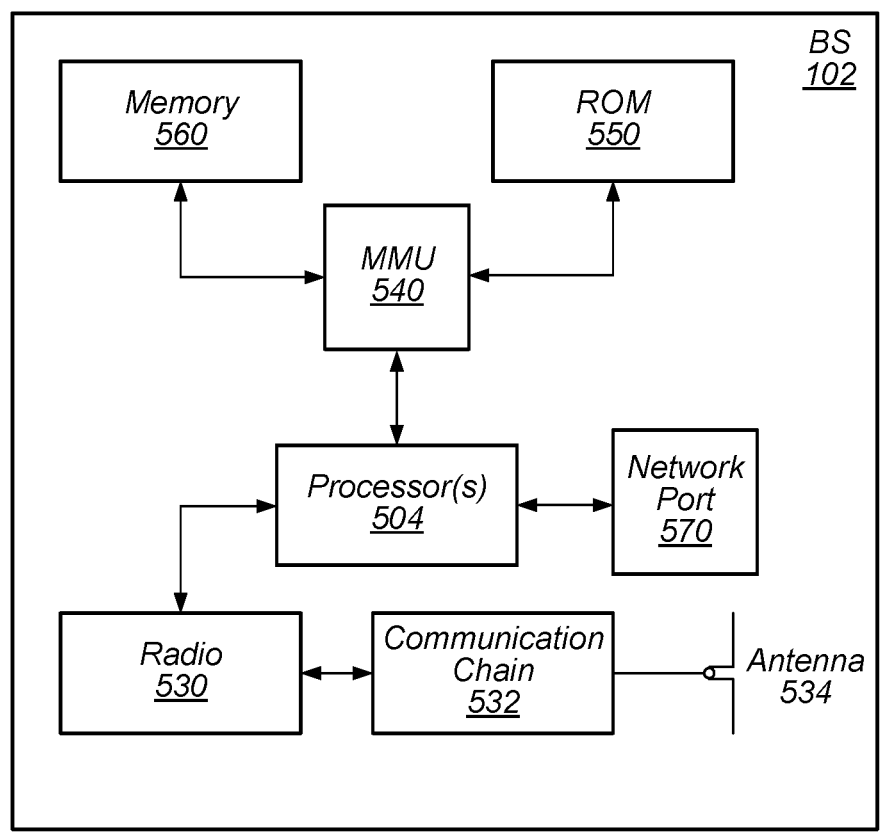
FIG. 5 is an example block diagram of a base station, according to some embodiments.

FIG. 5—Base Station

FIG. 5 is an example block diagram of a base station 102. The base station 102 may be an eNodeB, a gNB, or an access point, among various possibilities. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read-only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc. A base station implementing a RAT may constitute a component of a radio access network (RAN), which may provide connectivity between the UE devices 106 and a core network.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Figure 6:
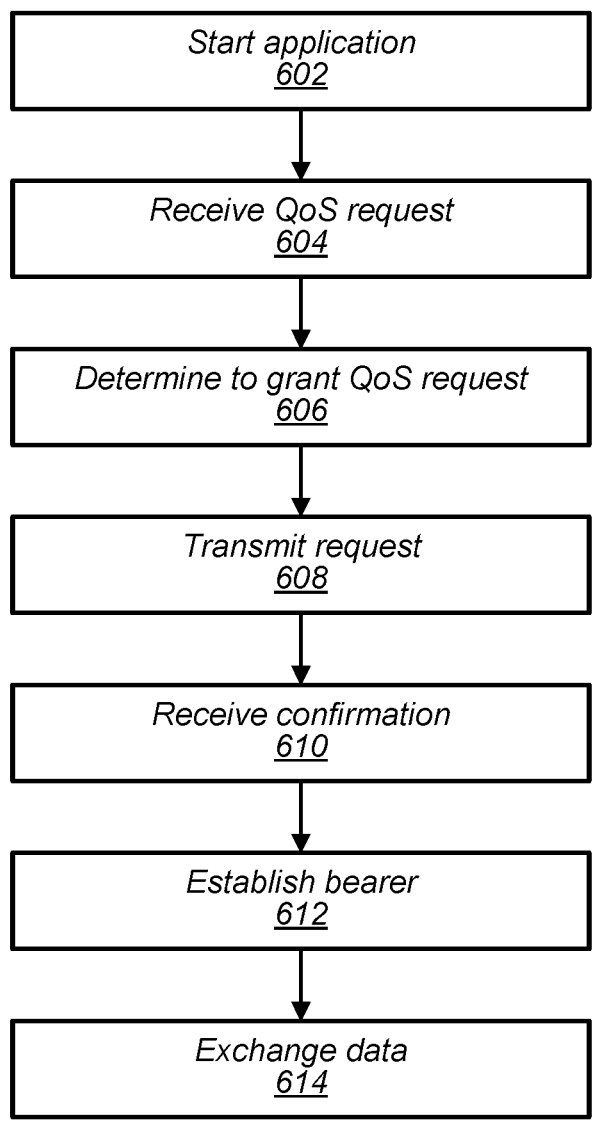
FIG. 6 is a flow chart diagram illustrating an example method to provide enhanced quality of service (QoS) for an application, according to some embodiments.

FIG. 6—UE Assistance for QoS Detection and Control for an Application

The number and diversity of applications executing on UEs is large and growing. Some of these applications may rely on communications between a UE (e.g., UE 106) and an application server 320. Some of these applications may require a minimum QoS (e.g., in terms of latency, uplink and/or downlink throughput, jitter, error rate, etc.) for the communication between the UE and the server in order to provide an acceptable QoE to the user of the application, e.g., in order to function as intended by the application provider. Said another way, some of these applications may provide better performance (and thus better QoE) with better QoS. Therefore, increasing numbers of non-carrier (e.g., third party) servers may request (or would benefit from a better ability to request) specific QoS from a carrier network. Prior methods may not provide effective and/or convenient mechanisms for an application to request that a network (e.g., a cellular network) provide a requested QoS for the connection between the UE and the application server 320.

A message (e.g., a non-access stratum (NAS) message) requesting a QoS for an application may not include enough information for a network to have charging and/or policy control. For example, current 3GPP standards may provide for a "bearer resource allocation request message" which may be transmitted from an application operator (e.g., application server 320) to a core network entity (e.g., an MME 322 and/or a policy and charging rules function (PCRF)). Such a request may be made over an Rx interface. Current standards may allow a non-carrier server (e.g., app server 320) to connect to PCRF through the Rx interface. However, there may be no standard protocol, message, or context for such communication between the server and the PCRF. Significant details of how such a request would be made (e.g., what details are included) may not be specified. For example, the message may only include flow information and may not include application related information. Scalability issues associated with the number of application servers potentially requesting to communicate with a PCRF via the Rx interface are increasing. Therefore, it may be difficult or impossible for a network to have policy control. Accordingly, in practice, such requests may not typically be well supported by network operators. In other words, the "bearer resource allocation request message" may not be accepted in various cellular carriers' networks.

Accordingly, improved methods for providing enhanced QoS for at least some application servers may be desired. FIG. 6 illustrates exemplary techniques for performing UE assistance for QoS detection and control for an application. Aspects of the method of FIG. 6 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc.) or base station (e.g., processor(s) 504, or a processor associated with radio 530 and/or communication chain 532, among various possibilities) may cause the UE or base station (respectively) to perform some or all of the illustrated method elements. Similarly, one or more processors (or processing elements) of one or more network elements (e.g., a Packet Data Network Gateway (PGW), PCRF, entitlement server, MME, etc.) may be configured to cause the network element(s) to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE (e.g., UE 106 or other wireless device) may start an application (602). The application may execute on the UE, e.g., using one or more processors of the UE. The application may be initiated or launched by the user of the UE, or may be initiated based on other factors (e.g., a timer, a signal from an application server 320, etc.). The application may be any type of application, e.g., including music, video, voice or video calling, gaming, news, productivity, etc. The application may be configured to communicate with an application server 320 and may require or benefit from certain QoS characteristics for the communication of data between the UE and application server.

The wireless device (e.g., a processor of the UE, such as an application processor or a QoS agent or program executing on such a processor) may receive a request from the application for a QoS (604), according to some embodiments.

The request may be received via an application programming interface (API), e.g., a QoS API. A QoS API may provide an interface for applications executing on the UE to request enhanced QoS for communications with an application server (e.g., the application server 320).

The request may indicate various details about the requested QoS for communications of the application with the application server 320. For example, the request may indicate QoS parameters such as latency, throughput, jitter, error rate, etc., e.g., for communication with server 320. Further, the request may indicate routing information associated with the requested QoS. For example, the request may indicate address information for one or more application servers 320.

The request may be created in various ways (e.g., at or after the start of the application). For example, according to various embodiments, the application may initiate the request automatically or in response to one or more measurements, the application server 320 may inform the application to initiate the request (e.g., automatically or in response to one or more measurements) via an application layer message, or the application may initiate the request in response to user input.

The request may indicate one or more QoS parameters for which improved QoS is requested (e.g., parameters that are most limiting to the QoE). The request may be based in part on one or more measurements of such parameters. For example, at a first time the application may determine that throughput to/from app server 320 is limiting (e.g., throughput is too low for a desired QoE) and may thus request an increased throughput. At a second time, the application may determine that latency (e.g., to/from app server 320) is limiting (e.g., too high for the desired QoE), and may thus request decreased latency.

In response to the request, the UE may determine whether or not to grant the request (606), according to some embodiments. The UE may take various actions to make this determination. For example, the UE may check a profile associated with the application (e.g., by retrieving information from an entitlement server or other network element and/or based on information stored at the UE). This may include checking security, charging, payment, and/or user or network preference information associated with the application. In other words, for any of numerous reasons, a UE and/or network may not wish to grant enhanced QoS to all applications (e.g., or all applications that may initiate a QoS request). Thus, the UE may filter out (e.g., determine to deny) at least some QoS requests under some circumstances. Further, the UE may consider factors such as other applications executing on the UE, network conditions, battery level, etc. in order to determine a priority of the traffic of the application requesting the QoS relative to other objectives and may determine whether or not to grant the request based on the priority. According to various embodiments, the UE may or may not inform the application whether the request is denied or granted.

Based on a determination to grant the request, the UE may generate and transmit a request to a core network entity (608), according to some embodiments. The request may request a dedicated bearer or pipeline for the application, e.g., between the UE and the application server 320. The requested, dedicated bearer may be an end-to-end bearer 350. The request may use an extended Resource ReSerVation Protocol (RSVP) (e.g., referred to as Mobile RSVP) based on RFC2205. The request may be a Resv message according to RSVP (e.g., including the extensions and modifications discussed further below, e.g., with respect to FIGS. 9-14).

The UE may send the request to a PGW and/or Policy and Charging Enforcement Function (PCEF), among various possibilities. The address for the PGW may be obtained from a Path message obtained from the network (e.g., another type of RSVP message) or from a protocol configuration option (PCO) in a NAS message.

The Resv message may include a "3GPP QoS Object" as further described below. The object may include application profile and QoS information, e.g., which may be necessary for the PGW/PCEF to grant the request and/or to implement the dedicated bearer for the application.

Based on the request (and the included information), the PGW/PCEF may check with a PCRF to determine whether or not to grant the request. Based on granting the request, the PGW/PCEF may transmit a confirmation to the UE and may begin to set up the dedicated bearer.

The UE may receive a confirmation from the network (e.g., PGW/PCEF, among various possibilities) that the request is granted (610), according to some embodiments. For example, the UE may receive a Resv Conf message (e.g., according to the extended RSVP) confirming that the request is granted. The confirmation (e.g., Resv Conf message) may further specify various details about the dedicated bearer.

The UE (e.g., in coordination with a base station and the PGW/PCEF and/or other network element(s), among various possibilities) may establish the dedicated bearer (612), according to some embodiments. The dedicated bearer, e.g., end-to-end bearer 350, may connect the UE to the application server 320 (e.g., according to routing information included in the request). Each constituent connection of the dedicated bearer 350 may be configured so that the entire end-to-end bearer 350 may provide the QoS characteristics requested by the application. For example, the connection between the core network (e.g., EPC 100) and the app server 320 may be configured so that the end-to-end bearer provides a round-trip latency (from UE 106 to app server 320 and back to UE 106) that meets a target latency for the application. Other end-to-end metrics may be used (e.g., throughput, jitter, etc.).

The UE and the application server 320 may exchange data (e.g., application traffic) using the dedicated bearer 350 (614), according to some embodiments. The data may include uplink and downlink messages. The UE and the network (e.g., base station) may also exchange control information related to the dedicated bearer and exchange of data. For example, a base station may provide uplink and/or downlink resources for the transmission and reception of the application data. The resources may be selected in order to provide the QoS attributes for a satisfactory QoE for the user of the application.

It will be appreciated that various other transport protocols (e.g., instead of or in addition to RSVP) may be used in context of FIG. 6, e.g., to transmit the request in 608 and/or to receive confirmation in 610. Among various possibilities, any of the following protocols may be used: HyperText Transfer Protocol (HTTP), HTTP Secure (HTTPs), and/or stream control transfer protocol (SCTP).

Figure 7:
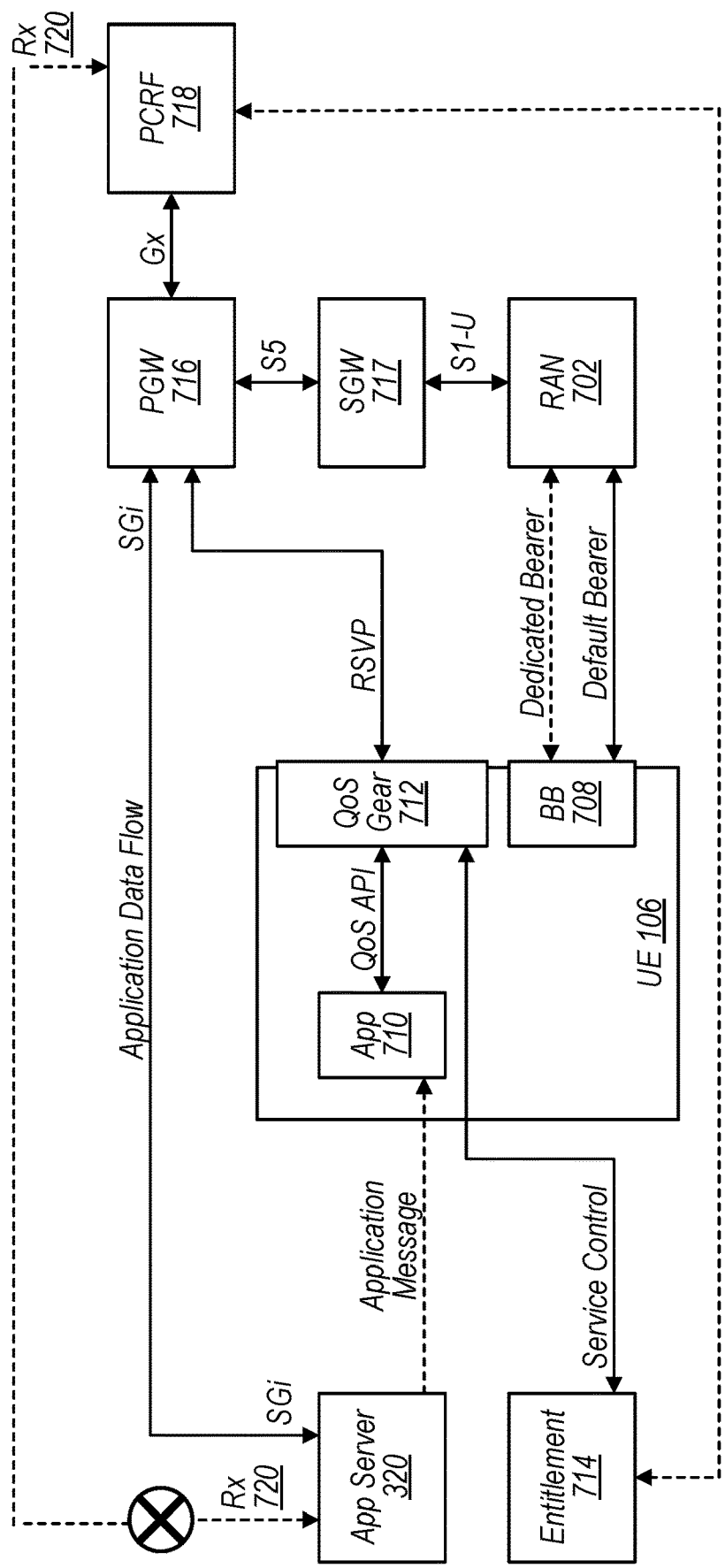
Figure 8:
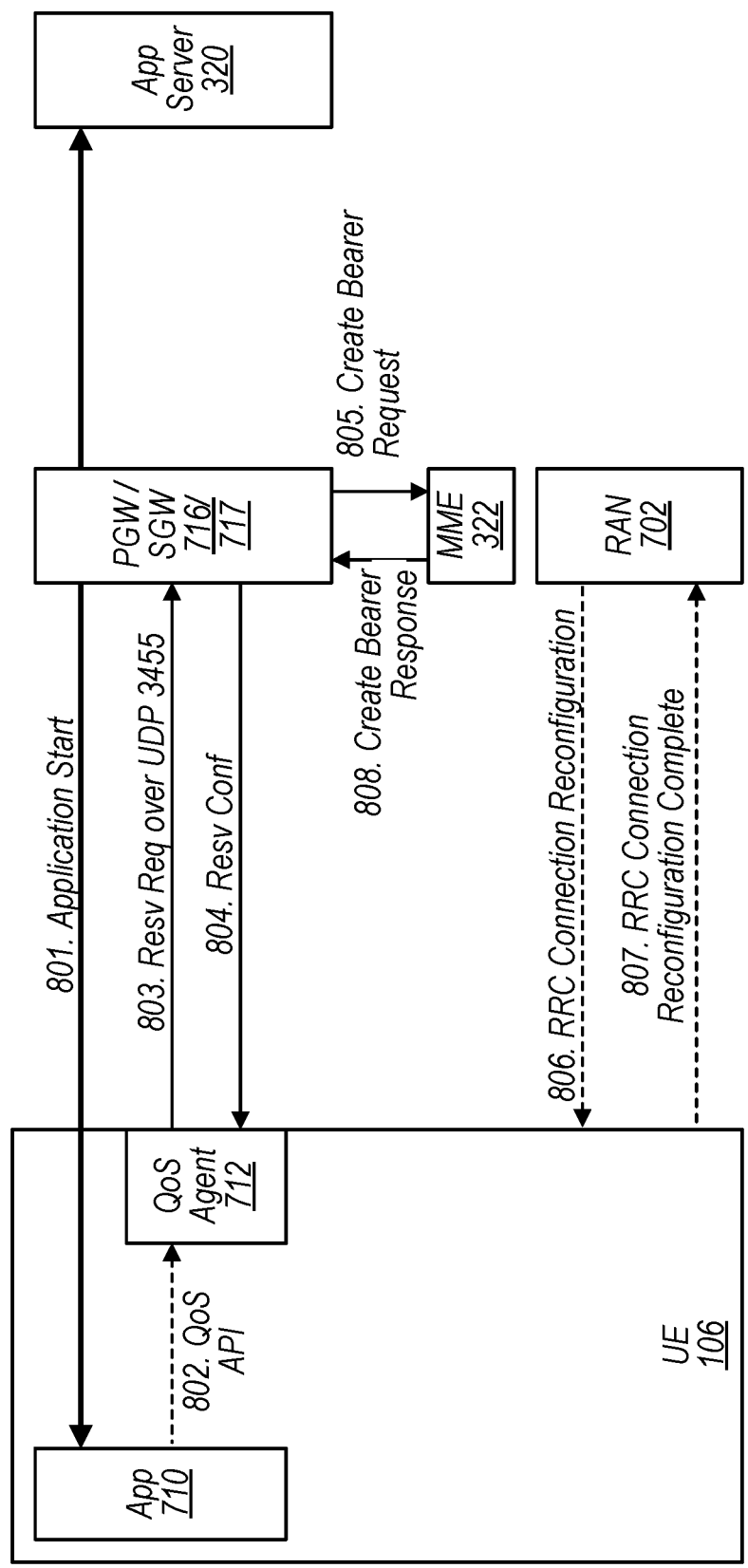

FIGS. 7-8—Setting up a Bearer Using Mobile RSVP

FIG. 7 is a block diagram illustrating example relationships between various UE and/or network and other entities usable for providing enhanced quality of service (QoS) for certain wireless communications of an application, e.g., according to aspects of the method of FIG. 6, according to some embodiments. It is noted that FIG. 7 merely illustrates relationships among certain example UE-side and networked or external entities and should not be construed to narrow the scope or spirit of the subject matter described herein, and that various other embodiments of such systems and methods are possible.

Shown centrally is a UE (e.g., the UE 106 in FIGS. 1-4), which contains various components and entities, e.g., UE or UE-side entities. The UE 106 (referred to simply as "the UE" in the following description) may be connected to a network, e.g., via a radio access network (RAN) 702 as shown. The RAN 702 may be considered a component of the network. Among performing other functions, the RAN may provide connectivity between the UE and a core network of the cellular network. The UE may be camped on a base station (e.g., the base station 102 in FIG. 1, 2, 3, or 5) that constitutes part of the RAN 702. The UE may communicate with the RAN, e.g., the base station, using a variety of radio access technologies (RATs). For example, the UE may communicate with the RAN using the LTE RAT and/or an NR RAT. In the case of some LTE embodiments, the RAN may constitute an Evolved UMTS Terrestrial Radio Access (E-UTRA) Network, e.g., an E-UTRAN.

The UE may include a baseband (or baseband processor) (BB) 708 for conducting wireless communications (among other circuitry, such as RF circuitry, receive/transmit chains, etc.). Thus, as shown, information may be conveyed between various UE entities and the baseband processor 708, so that information may flow between the UE entities and the networked/external entities. Thus, while FIG. 7 indicates relationships between UE entities and external entities, these relationships are simplified representations of the flow of certain relevant information, and it is understood that communications between the UE entities and external entities are conducted by various intermediary components, such as one or more antennas on the UE, the baseband processor 708, and one or more network devices such as the RAN 702.

The UE may store and execute various types of application software, e.g., App 710, which may be one of many applications or apps that perform wireless communications. These may include applications that provide messaging, email, browsing, video streaming, short video, voice streaming, real-time or online gaming, or various other online services or services that perform wireless communication with a network. Here it is noted that when it is said that a UE-side application performs wireless communication, it is understood that, more particularly, certain application processes cause the UE to perform said wireless communications for the application. Communications performed by a certain UE-side application or app, e.g., performed by the UE for the application, may be termed, e.g., application traffic or application communications, or application-specific or application-related communications (or traffic, etc.).

As discussed above, certain applications that perform wireless communications may require or benefit from a certain level of communication service quality, or quality of service (QoS). As used herein, QoS may refer generally to a configuration of various network mechanisms that control the priority, speed, latency, jitter, reliability, and/or other qualities of certain traffic, e.g., of a certain pipeline or bearer of communications, and/or may refer to the level of performance or quality experienced by certain traffic conducted over a network, as well as this performance's impact on devices, users, applications, etc. that may be participating in the communications. For example, the app 710 may desire a high level of QoS, or high QoS, for certain app-related communications conducted over the cellular network. In other words, certain functionality of the app 710 may demand (or benefit from) communications that are low-latency and/or reliable to a certain degree. Hence, the app 710 may benefit from a certain QoS, or QoS configuration for its communications with app server 320. For example, a certain configuration of network traffic prioritization, resource reservation control, and other mechanisms and parameters may be intended to achieve a targeted level of communication performance, or QoS. The app server 320 may transmit an application message to the app 710 indicating to the app 710 to request an enhanced QoS.

Based on the application message and/or other factors (e.g., an autonomous determination), the app 710 may indicate a request for an enhanced QoS to QoS gear 712. QoS gear 712 (e.g., a QoS agent) may be implemented as a program executing on an application processor of the UE, or may be implemented with specific hardware (e.g., a processing element, etc.). The app 710 may use a QoS API to exchange information, such as a QoS request with QoS gear 712.

In response to a request from app 710 for an enhanced QoS, the QoS gear 712 may communicate (e.g., via baseband processor 708 and RAN 702, although for clarity, illustrated as a direct connection) with entitlement server 714. The QoS gear 712 may determine to grant the request. Accordingly, the QoS gear may transmit to PGW 716 (e.g., via baseband processor 708 and RAN 702, although for clarity, illustrated as a direct connection) a request for an enhanced QoS. The request may be transmitted using the Mobile RSVP.

The PGW 716, (e.g., in consultation with PCRF 718 and/or other network elements) may determine to establish a dedicated bearer to provide the enhanced QoS. Accordingly, the RAN 702 and UE 106 may establish a dedicated bearer for app 710. This dedicated bearer may be used instead of or in addition to a default bearer. Further, the dedicated bearer may be an end-to-end bearer 350, extending from the UE, through the RAN 702, SGW 717, and PGW 716, to the app server 320. The network traffic prioritization, resource reservation control, and other mechanisms and parameters for each of these links may be configured to achieve a targeted level of communication performance, or QoS for the dedicated, end-to-end bearer 350.

For illustrative purposes, the Rx interface 720 is illustrated and marked with an "X" indicating that the Rx interface may not be used for requesting the enhanced QoS according to some embodiments. In contrast, in other systems, the app server 320 may transmit a request for enhanced QoS over the Rx interface.

FIG. 8 is a communication flow diagram, illustrating messages between various elements in order to implement aspects of the method of FIG. 6, according to some embodiments. In various embodiments, some of the elements of the methods shown may be performed concurrently, in a different order than shown, may be substituted for by other method elements, or may be omitted. Additional method elements may also be performed as desired. As shown, the method may operate as follows.

The application 710 may be initiated (801). The application may be initiated on the UE 106 and/or app server 320. Application traffic for the app 710 may be exchanged between the UE 106 and app server 320 and a data connection may be established between the app server and the UE-side app client for this purpose. The application may be a game (e.g., online, real-time, multi-player, interactive, etc.), a voice or video chat (e.g., video conferencing) application, a streaming audio or video application, a short video application, virtual reality, etc. The application server may communicate with app client through application layer messaging, and the app client may determine (e.g., based on an indication from the server or independently) to request enhanced QoS service.

The app 710 (e.g., app client executing at the UE 106) may make a request for enhanced QoS to the QoS agent 712 (802). The request may be made using a QoS API. The UE may perform some verification of the request and/or app. For example, the UE may check an application profile and/or user profile. Further, the UE may check with an entitlement server.

If the verification returns a positive result, the UE may determine to grant the request. Accordingly, the QoS agent 712 may transmit an RSVP Resv request to the PGW 716/SGW 717 in the 3GPP core network (803). The request may be transmitted over user datagram protocol (UDP) port 3455, among various possibilities. The request may be or include an RSVP Resv message with a 3GPP QoS object. The request message may include information for the QoS request and policy control. For example, the request may include any or all of:

Application information, such as Application ID, Name, Vendor, e.g., to identify the app and/or traffic of the app.

Flow information, including treatment and differentiated services code point (DSCP) values, e.g., to indicate QoS requirements of the application traffic.

Authentication information useable to authenticate the application and/or traffic of the app.

The PGW 716/SGW 717 may grant the request and may confirm that the request is granted via a RSVP Resv Conf message (804). In determining whether to grant the request, the PGW 716/SGW 717 may consider any of the information included in the request and may compare such information with network rules (e.g., and may exchange messages with a PCRF and/or PCEF for this purpose).

The PGW 716/SGW 717 may also send a "create bearer request" to the MME 322 to create a dedicated bearer, e.g., based on granting the request (805).

The MME 322 may establish a dedicated, end-to-end bearer 350 with the desired QoS characteristics. For example, the MME 322 may cause the air interface (e.g., RAN 702) to configure and set up a dedicated bearer with the UE in the air interface. The RAN 702 may transmit an RRC connection reconfiguration message (806) to the UE to configure the dedicated bearer.

The UE 106 may configure the bearer and respond with an RRC connection reconfiguration complete message (807).

The RAN 702 and the MME 322 may inform the PGW/SGW that the bearer is configured and may transmit a create bearer response (808).

Use cases—Manufacturer Provided Applications vs. Third-Party Applications

Embodiments of the methods of FIG. 6 may be applied to numerous types of applications that may execute on UEs. For example, embodiments may apply to applications provided by a manufacturer of the device and/or by third-party application developers. The major difference in handling these two types of applications may be that manufacturer-provided applications may not require the same level of scrutiny prior to a UE transmitting a request for enhanced QoS.

For example, servers associated with manufacturer-provided applications may not be configured to connect to a carrier's PCRF via the Rx interface. When a user starts such an application, QoS API may be called to request QoS services from the network. Accordingly, the QoS agent 712 may send an RSVP Resv message to PGW/PCEF to request a dedicated bearer for the application. The PGW may initiate dedicated bearer for data flow, and the application user can enjoy high quality of service provided by the dedicated bearer.

In the case of third-party applications, there may be many third-party servers providing applications and mobile service. Network carrier may choose not to connect so many servers to its core network. Accordingly, the UE device may act as "QoS agent" to help these application to obtain QoS. A third-party application be screened (e.g., may pass an entitlement check) first. For example, an entitlement server may enforce the service control on applications. Thus, an app may call a QoS API provided by the QoS Gear to request QoS in sane way as manufacturer provided applications, e.g., subject to the entitlement screening.

FIGS. 9-14 and Additional Information on Mobile RSVP

Two publications underpinning RSVP are RFC 2205 (e.g., Braden, B., Ed., et. al., "Resource Reservation Protocol (RSVP)—Version 1 Functional Specification", RFC 2205, September 1997) and RFC 2210 (e.g., Wroclawski, J., "The Use of RSVP with IETF Integrated Services", RFC 2210, September 1997). Both RFC 2205 and RFC 2210 are included by reference as though fully and completely set forth herein.

The original RSVP protocol may be used by a host or router to request specific qualities of service for application data flows. The extended RSVP (e.g., Mobile RSVP) may be based on RFC2205. Mobile RSVP may follow the RSVP framework, and may extend the object and parameters specified in the protocol. In some embodiments, Mobile RSVP may:

1) provide for messages between UE and PGW.

2) provide for data flow information exchange for dedicated bearer establishment 3) not include resource reservation in UE, RAN, SGW or PGW (e.g., or other notes or interfaces). For example, after a dedicated bearer is established, resources for communications on that bearer may be provided according to existing network processes (e.g., uplink and downlink grants, scheduling requests, etc.).

4) provide RSVP message formats to deliver QoS and application information between UE and PGW.

5) provide a new e.g., 3GPP QoS object.

6) allow the UE to send Resv message without receiving a Path message, in contrast to existing RSVP message flows.

7) include two new messages for latency measurement, e.g., ResvEcho and Resv EchoRes.

Thus, Mobile RSVP may be used to trigger QoS (e.g., trigger establishment of a new bearer), exchange QoS and application information, measure latency, and carry traffic flow templates (TFT) and related information to the network. Further, the UE may be configured to help the network (e.g., PGW) detect application start and stop, e.g., to inform the network when a dedicated bearer is or is not needed to support the application.

In some embodiments, Mobile RSVP may be configured to provide unicast functionality.

The new ResvEcho and ResvEchoRes messages may be used to measure the round trip latency between UE and PGW, according to some embodiments. The UE may send ResvEcho Message and when the PGW receives ResvEcho message it may immediately send back a ResvEchoRes Message. Thus, the UE may be able to determine latency based on the time difference between sending the ResvEcho and receiving the ResvEchoRes. The IP destination address of ResvEcho message may be the unicast address of PGW, the PGW IP address may be obtained from the path message or from 3GPP protocol configuration option (PCO). The message format for ResvEcho and ResvEchoRes may follow RFC 2205, and Message Type is defined as: 190=ResvEcho, 191=ResvEchoRes.

The new RSVP object may be referred to as "3GPP QoS Object". The format may follow RFC 2205. The 3GPP QoS object may have class=239, c-type=1 and a list of Information Elements. The format of information element (IE) may be as illustrated in FIG. 9, according to some embodiments. Thus, the IE may specify the length of the IE, and the type of the IE. The length may depend on the type and content of the data. Padding may be included. It will be appreciated that the illustrated format is exemplary only and that other formats may be used as desired.

FIG. 10 is a table summarizing the different types of IEs that may be included in the 3GPP QoS object, according to some embodiments. The illustrated types are application information, IPv4 traffic flow template (TFT), IPv6 TFT, and service quality. Note that the illustrated values are exemplary only. Additional or different types may be defined as desired.

FIG. 11 illustrates an application information IE, according to some embodiments. Application information IE may carry the application related information, e.g.: service provider, application identification, and account. It will be appreciated that the illustrated format is exemplary only and that other formats may be used as desired.

FIG. 12 illustrates an IPv4 TFT IE, according to some embodiments. The IPv4 TFT IE may carry the IP filter information for PGW to identify and route flows associated with the application. In other words, the TFT and/or packet filter may indicate to the PGW what packets should be routed on a dedicated bearer for the application, e.g., between the UE and the app server. It will be appreciated that the illustrated format is exemplary only and that other formats may be used as desired.

FIG. 13 illustrates an IPv6 TFT IE, according to some embodiments. The IPv6 TFT IE serves a similar purpose as the IPv4 TFT IE, in the context of IPv6 rather than IPv4.

Figures 14, 15:
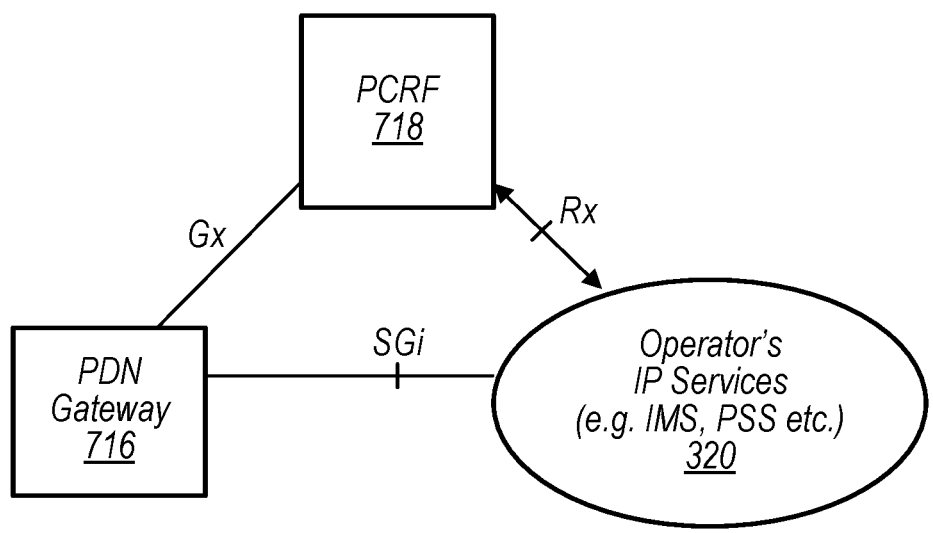

FIG. 14 illustrates a service quality IE, according to some embodiments. The service quality IE may carry an indication of the service quality measured or requested by the UE. An operation field of the IE may specify whether the indicated QoS characteristics are requested by the UE (e.g., for a dedicated bearer) or measured by the UE (e.g., for a specific bearer and/or in general). For example, the UE may use a service quality IE (e.g., of the request type) to specify QoS characteristics requested for a dedicated bearer associated with an app 710. For example, the service quality IE may specify requested latency, jitter, bit rate, and/or error rate. It will be appreciated that the illustrated format is exemplary only and that other formats may be used as desired. For example, other details may be included such as a bearer identity, timing or parameters of reported measurements, etc.

In some embodiments, the UE may support the following RSVP messages: Resv, Path, ResvErr, ResvConf, ResvTear RSVP messages and two new messages ResvEcho and ResvEchoRes. In order to transmit a request for a dedicated bearer, the UE may send a Resv Message to PGW. The Resv message may include one or more 3GPP QoS Object and one or more information elements. For example, the Resv message may include an application information IE, a TFT IE (e.g., either IPv4 or IPv6, as appropriate), and a service quality IE (e.g., with an operation field indicating that the included QoS characteristics are a request).

If the requested QoS can be granted (e.g., in view of the application information), the PGW may reply with a ResvConf message. Otherwise, the PGW may respond with a ResvError message to UE.

In some embodiments, the UE 106 may receive Path messages from PGW 716, however the UE may not send Path messages. Based on receiving a Path message, the UE may determine address and routing information, e.g., for the PGW 716.

In some embodiments, the UE may send a ResvTear message to indicate to the PGW to reconfigure a dedicated bearer. For example, the UE may use the ResvTear message to inform the PGW that the dedicated bearer is no longer needed, e.g., because the application for which the bearer was established is no longer executing on the UE or otherwise no longer requests the enhanced QoS. If the UE (and/or the application) desires to set a different QoS, the UE may follow the ResvTear message with a Resv message, e.g., in order to establish a new bearer with the different QoS.

In some embodiments, PGW may support Resv, Path, ResvErr, ResvConf, and ResvTear RSVP messages as well as the two new messages ResvEcho and ResvEchoRes.

In some embodiments, the PGW may send Path message to the UE to indicate its capacity and IP address.

In some embodiments, the PGW may receive Resv message from UE, however the PGW may not send Resv message to the UE.

In some embodiments, the PGW may determine if a requested QoS is available in response to a Resv message including a service quality request IE from a UE. If the requested QoS is available to the UE (e.g., and/or to the specified application), the PGW may send back ResvConf message. Otherwise the PGW may respond with ResvErr message to UE.

In some embodiments, the PGW may receive ResvTear message from UE, and release the dedicated bearer.

It will be appreciated that various other transport protocols (e.g., instead of or in addition to RSVP) may be used transport the various messages, objects, information elements, etc. of FIG. 9-14. Among various possibilities, any of the following protocols may be used: HyperText Transfer Protocol (HTTP), HTTP Secure (HTTPs), and/or stream control transfer protocol (SCTP).

FIG. 15—Application Operator Connections

FIG. 15 illustrates exemplary connections of an application operator to a core network, according to some embodiments. As shown, the operator's IP services (e.g., including IMS, PSS, etc., e.g., an application server 320) may be connected to a PDN gateway (e.g., PGW 716) via an SGi interface. The SGi interface may be used to communicate application data between the application server 320 and a UE 106 that is executing the application. The application operator (e.g., app server 320) may also be connected (via an Rx interface) to PCRF 718. The PGW 716 and PCRF 718 may use the Gx interface to exchange information. For example, the PGW 716 may communicate information related to a request for enhanced QoS from a UE (e.g., executing an app 710 associated with the application operator). Related information may or may not be exchanged using the Rx interface.

Figure 16:
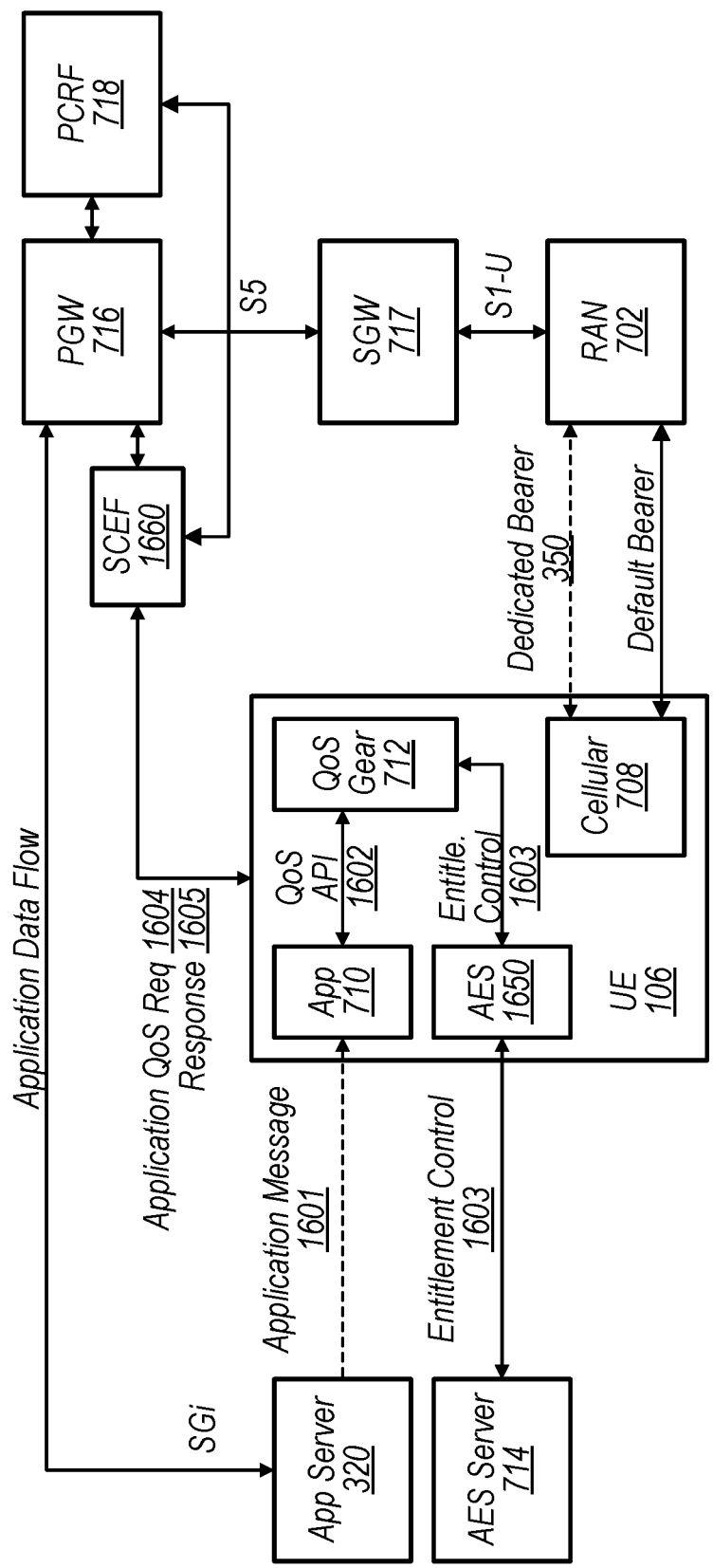
FIGS. 16-18 provide additional examples in context of a 4G network.
Figure 17:
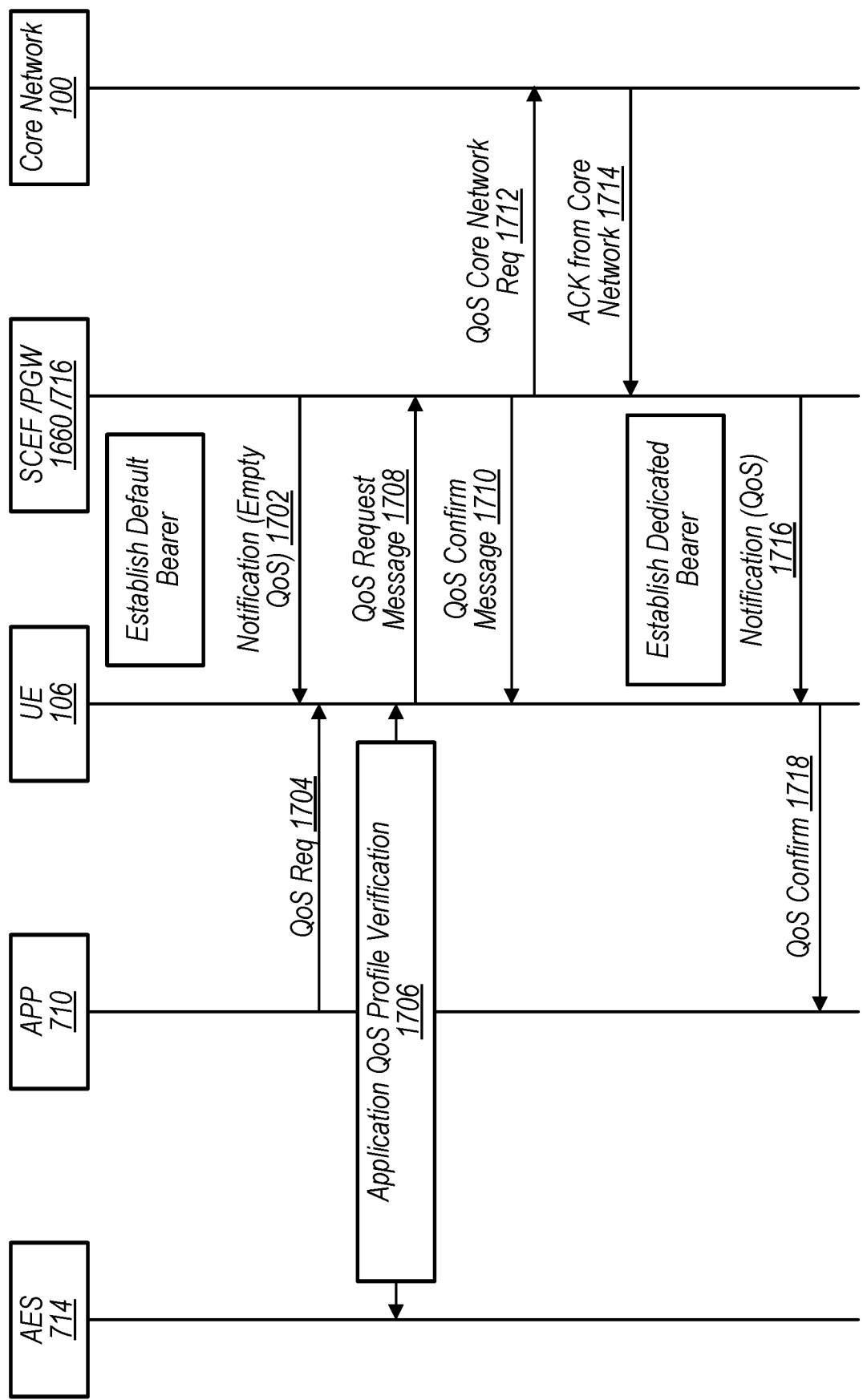
Figure 18:
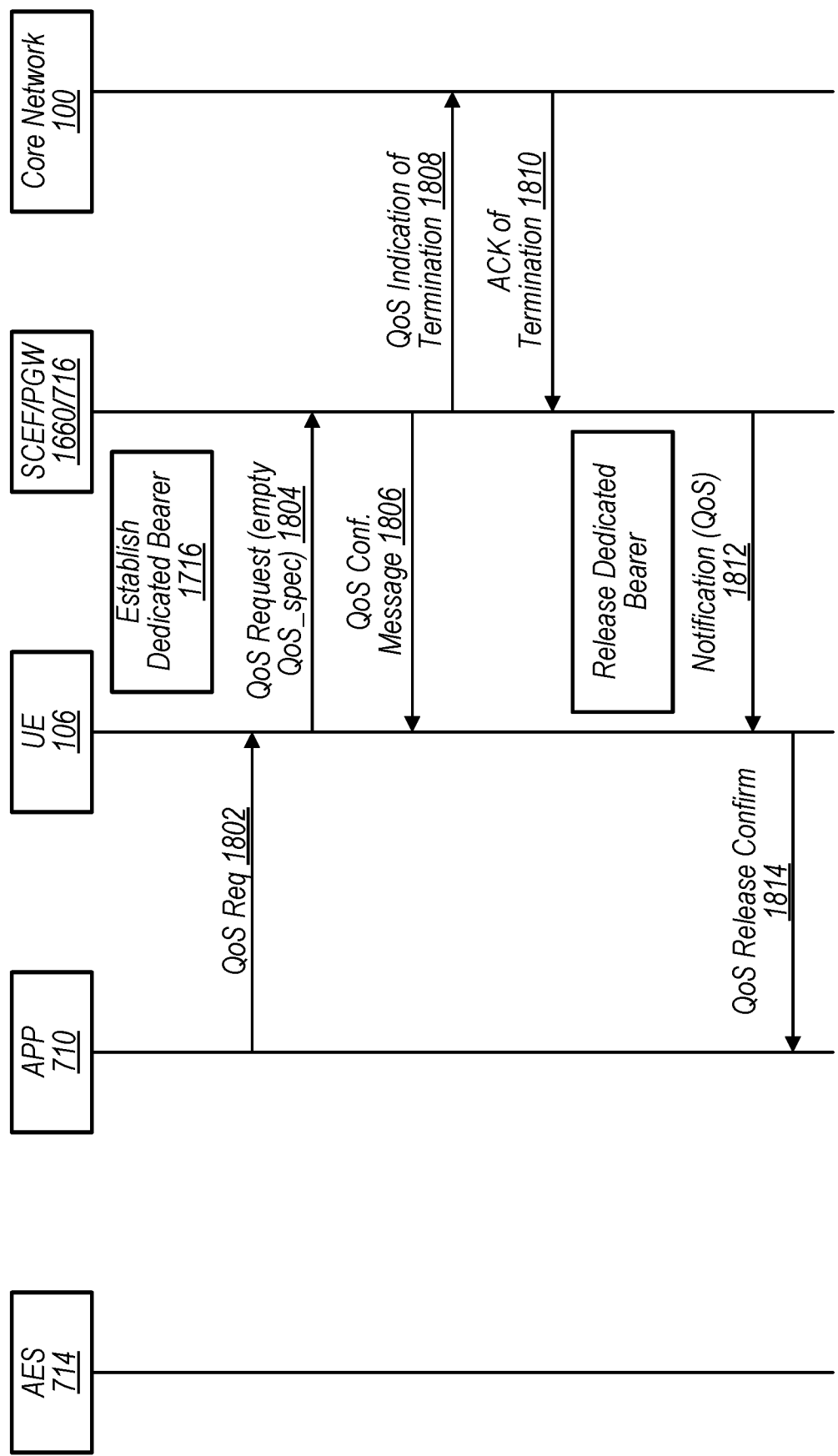

FIGS. 16-18—Further 4G Examples

FIG. 16 is a block diagram illustrating example relationships and messages between a UE (e.g., UE 106) and various elements of a 4G network. The illustrated relationships and messages may be usable for providing an enhanced QoS pipeline (e.g., via a communication network) for certain wireless communications of an application, e.g., according to aspects of the method of FIG. 6, according to some embodiments. It is noted that FIG. 16 merely illustrates relationships among certain example UE-side and networked or external entities and should not be construed to narrow the scope or spirit of the subject matter described herein, and that various other embodiments of such systems and methods are possible. As described above, 4G core network standards may allow an application server (e.g., 320) to connect to a PCRF and/or Service capability exposure function (SCEF) and to send request for a specified QoS with a UE. However, such options may not be widely available or effective. For example, there may be no standard Protocol/Message/Context between server and PCRF/SCEF/NEF in 4G. Thus, interoperability issues may complicate deployment and scalability.

Shown centrally is a UE (e.g., the UE 106 in FIGS. 1-4), which may be connected to a network, e.g., via a radio access network (RAN) 702 as shown. The RAN 702 may be considered a component of the network. Among performing other functions, the RAN may provide connectivity between the UE 106 and a core network of the cellular network. The UE 106 may be camped on a base station (e.g., the base station 102 in FIG. 1, 2, 3, or 5) that constitutes part of the RAN 702. The UE 106 may communicate with the RAN, e.g., the base station, using a variety of radio access technologies (RATs). For example, the UE 106 may communicate with the RAN using the LTE RAT and/or an NR RAT. In the case of some LTE embodiments, the RAN may constitute an E-UTRAN. The BS 102 may be connected to an SGW 717 via an S1-U connecting. The SGW 717 may be connected to a PGW 716 via an S5 connection.

The UE 106 may include a baseband (or baseband processor) (BB) 708 for conducting wireless communications (among other circuitry, such as RF circuitry, receive/transmit chains, etc.). The baseband may be cellular circuitry, as illustrated. Thus, as shown, information may be conveyed between various UE 106 entities and the baseband processor 708, so that information may flow between the UE 106 entities and the networked/external entities. Thus, while FIG. 16 indicates relationships between UE 106 entities and external entities, these relationships are simplified representations of the flow of certain relevant information, and it is understood that communications between the UE 106 entities and external entities are conducted by various intermediary components, such as one or more antennas on the UE, the baseband processor 708, and one or more network devices such as the RAN 702.

The UE 106 may store and execute various types of application software, e.g., App 710, which may be any application or app that performs wireless communications. As discussed above, certain applications that perform wireless communications may require or benefit from a certain level of communication service quality, or QoS. The app server 320 may transmit an application message 1601 to the app 710 indicating to the app 710 to request an enhanced QoS pipeline between the UE 106 and the app server 320. It will be appreciated that such an application message 1601 may be transmitted via the core network, RAN 702, and baseband 708 to the UE, although it is illustrated directly, for clarity.

Based on the application message 1601 and/or other factors (e.g., an autonomous determination), the app 710 may indicate a request 1602 for an enhanced QoS pipeline to QoS gear 712. QoS gear 712 (e.g., a QoS agent) may be implemented as a program executing on an application processor of the UE, or may be implemented with specific hardware (e.g., a processing element, etc.). The app 710 may use a QoS API to exchange information, such as a QoS request 1602 with QoS gear 712.

In response to the request 1602 from app 710 for an enhanced QoS pipeline, the QoS gear 712 may communicate 1603 with application entitlement server (AES) 714 (e.g., via baseband processor 708 and RAN 702, although for clarity, illustrated as a direct connection via an AES entity 1650 executing on the UE). This communication 1603 may be referred to as entitlement control and may include any number of messages. If the application request 1602 is considered appropriate, the QoS gear 712 may determine to grant the request.

Accordingly, the QoS gear may transmit, to SCEF 1660 (e.g., via baseband processor 708 and RAN 702, although for clarity, illustrated as a direct connection) a request for an enhanced QoS pipeline 1604. The request 1604 may be transmitted using Mobile RSVP, HTTP, HTTPS, and/or SCTP, among various possibilities and may include a 3GPP QoS Object or other object, information element, etc.

The SCEF 1660 (e.g., in coordination with the PGW 716 and/or PCRF 718, among various other network entities) may determine to establish a dedicated bearer to provide the enhanced QoS pipeline. Accordingly, the RAN 702 and UE 106 may establish a dedicated bearer for app 710. This dedicated bearer may be used instead of or in addition to a default bearer. Further, the dedicated bearer may be an end-to-end bearer 350, extending from the UE, through the RAN 702, SGW 717, and PGW 716, to the app server 320. The network traffic prioritization, resource reservation control, and other mechanisms and parameters for each of these links may be configured to achieve a targeted level of communication performance, or QoS for the dedicated, end-to-end bearer 350. The SCEF 1660 may send a response 1605 to the UE 106 indicating that the request has been granted and/or indicating the establishment of the dedicated bearer. The response 1605 may be transmitted using Mobile RSVP, HTTP, HTTPS, and/or SCTP, among various possibilities.

FIG. 17 is a communication flow diagram, illustrating messages between various elements in order to implement aspects of the method of FIG. 6, according to some embodiments. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may set up a connection with a network, e.g., via RAN 702 (1702), according to some embodiments. The UE 106 and network may establish a default bearer and the SCEF 1660 and/or PGW 716 may transmit a notification of the attachment to the UE. The notification may be illustrated as "empty QoS" to indicate that no enhanced QoS is established at this time.

The app 710 executing on the UE 106 may provide a QoS request, e.g., specifying a desired QoS, to a QoS entity of the UE 106 (e.g., using the QoS API) (1704), according to some embodiments. In response to the QoS request, the UE 106 may verify the QoS profile of the app 710 with an AES server 714 (1706). In response to successful verification, the UE 106 may transmit a QoS request message to the SCEF 1660 and/or PGW 716 (1708). The QoS request message may specify a desired QoS for communication between the UE 106 and the app server 320 for application traffic of the app 710.

The SCEF 1660 and/or PGW 716 may transmit a confirmation (1710) to the UE 106 and may transmit a QoS request (e.g., in response to the request 1708 from the UE) to the 4G core network (e.g., EPC) 100 (1712), according to some embodiments. The QoS request to the core network may specify the desired QoS characteristics for a dedicated pipeline (e.g., end-to-end bearer) for application traffic between the UE 106 and app server 320. The elements of the core network may check the application profile, and, in response to a successful verification, acknowledge the request (1714) and instruct the SCEF 1660 and/or PGW 716 (and in turn the RAN) to establish the dedicated bearer for the application data flow or flows between the UE 106 and the App server 320. The dedicated bearer may be a dedicated end-to-end pipeline from the UE 106 to the app server 320, e.g., including any component connections (e.g., UE 106 to base station 102, base station 102 to gateway 716, gateway 716 to any intermediate network elements, intermediate network elements to app server 320, etc.) Each component connection of the dedicated end-to-end pipeline may be configured so that the entire end-to-end pipeline provides the desired QoS. For example, each of the component connections may be configured to meet or exceed the desired QoS. After the dedicated bearer (e.g., 350) is established, the core network may transmit a notification indicating the enhanced QoS to the UE (1716). The UE 106 may in turn confirm the QoS to the app 710 (1718). The application 710 and the app server 320 may exchange data using the dedicated bearer 350.

FIG. 18 continues from FIG. 17, and illustrates the release of the dedicated bearer. As shown, a dedicated bearer may be established between a UE 106 and SCEF 1660 and/or PGW 716 (1716) and may extend to app server 320 (not shown). The App 710 may send a QoS release message to the UE 106 (1802). Among various possibilities, such a release message may be sent through a QoS API. The release message may be sent in association with the user exiting the app, completing a game, or more generally the enhanced QoS being no longer required for the App 710.

In response, the UE 106 may send a QoS message to the SCEF 1660 and/or PGW 716 indicating to release the dedicated bearer (1804). The message may include an empty QoS specification, e.g., to indicate that a default bearer may be used and that the dedicated bearer is no longer desired.

The SCEF 1660 and/or PGW 716 may send a confirmation of the request to the UE 106 (1806). If the message is not received correctly, an error message may be sent.

Further, the SCEF 1660 and/or PGW 716 may send a request or notice to the core network 100 of the QoS message (1808). The core network 100 may acknowledge the request and/or instruct the SCEF 1660 and/or PGW 716 to release the dedicated bearer (1810). The SCEF 1660 and/or PGW 716 may transmit a notification to the UE 106 that the bearer is released (1812) and may release the bearer. The UE 106 may (e.g., using the QoS API) provide a confirmation to the App 710 that the dedicated bearer is released (1814).

It will be appreciated that the release process of FIG. 18 may be followed by establishing a new dedicated pipeline, e.g., with different (or possibly the same) QoS characteristics. For example, the QoS request 1802 may specify a change in the desired QoS. Accordingly, the initial dedicated pipeline may be released as shown and a new pipeline may be established with the changed QoS. For example, such a replacement pipeline may be established using messaging as described above with respect to 1708-1718.

Alternatively, a similar sequence of messages may be used to modify the QoS of the first pipeline (e.g., without releasing the first pipeline and replacing it with a new pipeline). For example, the QoS request message of 1708 may be used to request a modified QoS of the first pipeline.

Figure 19:
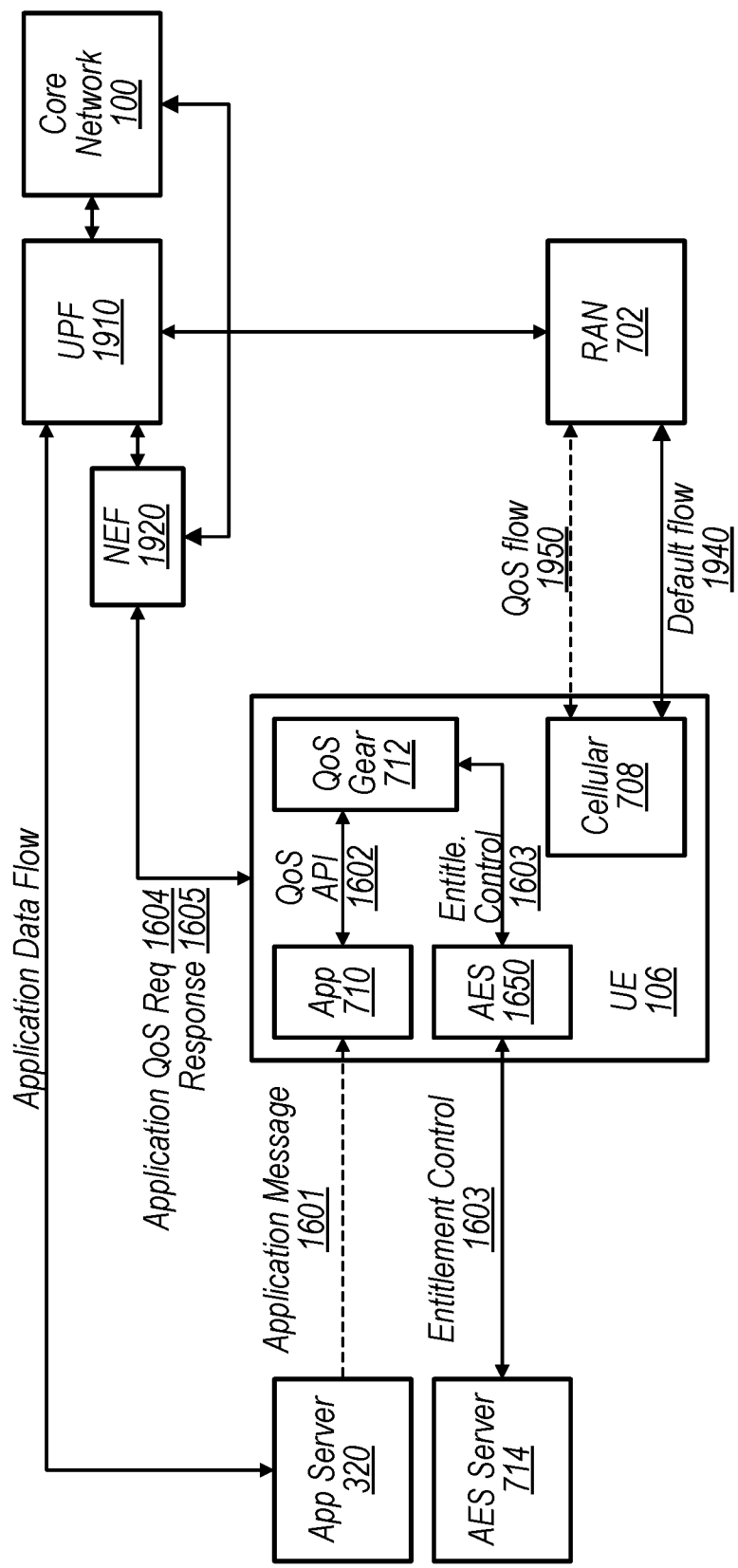
FIGS. 19-21 provide additional examples in context of a 5G network.
Figure 20:
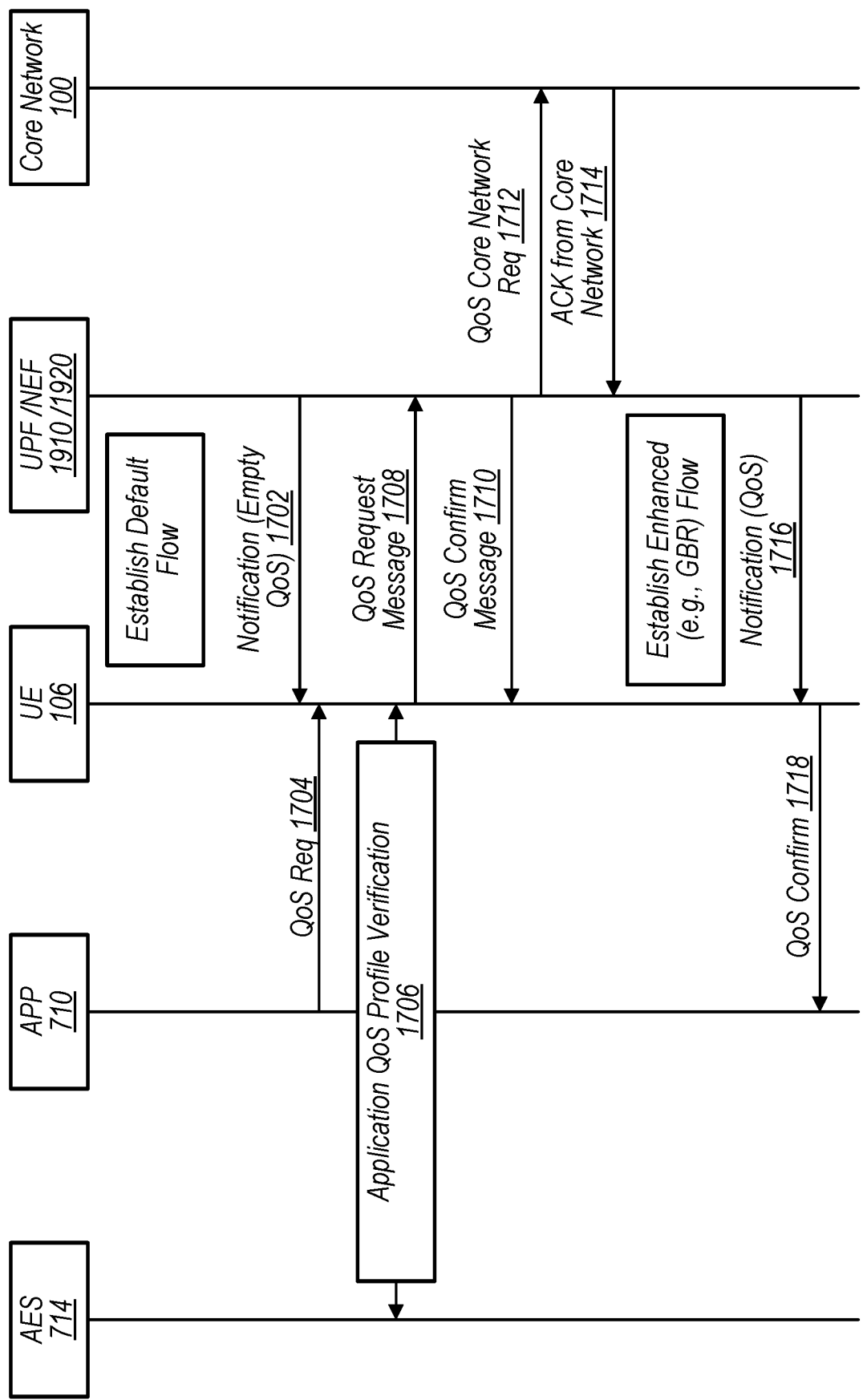
Figure 21:
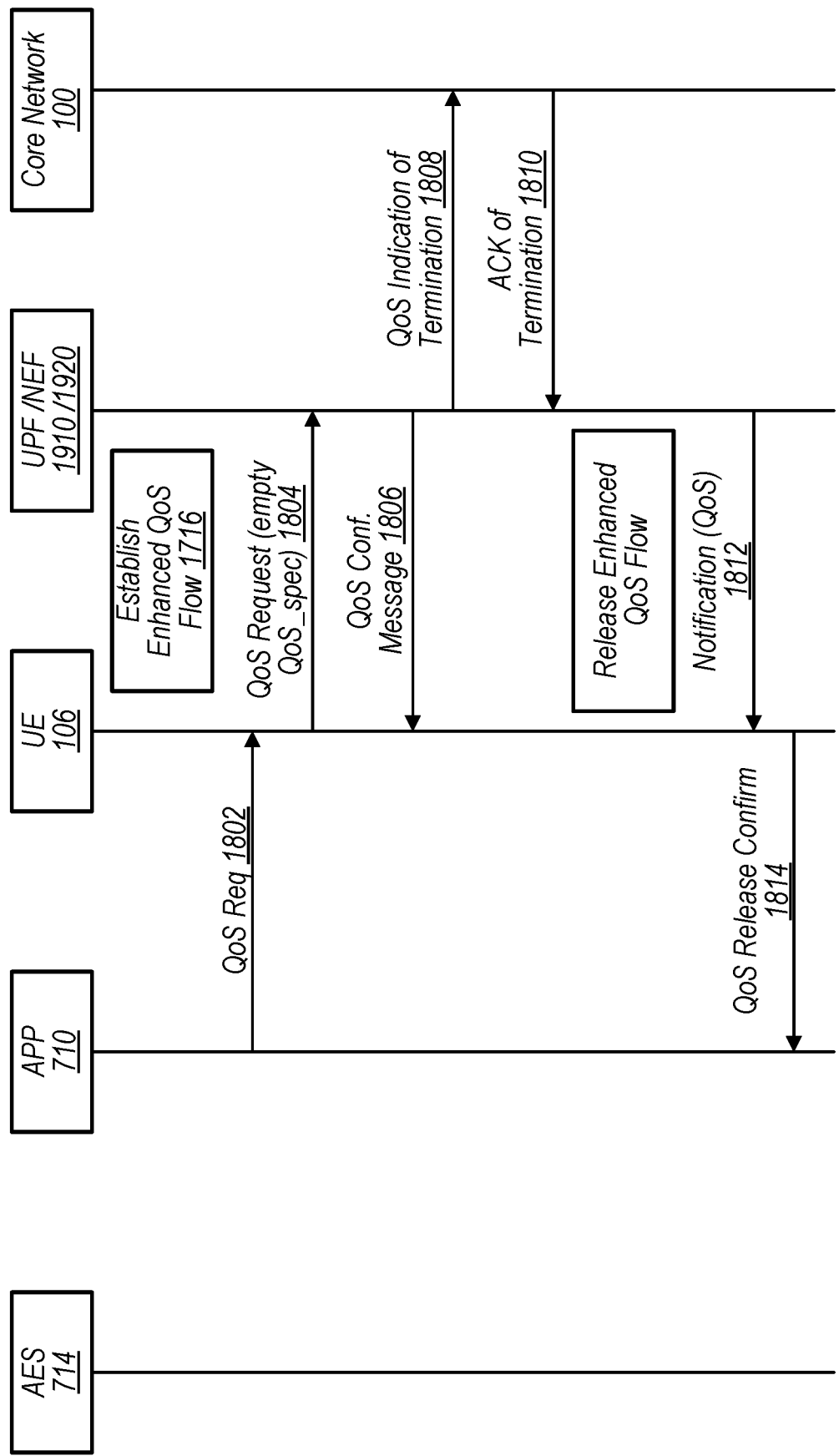

FIGS. 19-21—Further 5G Examples

FIGS. 19-21 are similar to FIGS. 16-18; however, FIGS. 19-21 provide illustrative examples in the context of a 5G network, e.g., as may operate according to 5G NR.

FIG. 19 is a block diagram illustrating example relationships and messages between a UE 106 and various elements of a 5G network. The illustrated relationships and messages may be usable for providing an enhanced QoS pipeline (e.g., via a communication network) for certain wireless communications of an application, e.g., according to aspects of the method of FIG. 6, according to some embodiments. It is noted that FIG. 19 merely illustrates relationships among certain example UE-side and networked or external entities and should not be construed to narrow the scope or spirit of the subject matter described herein, and that various other embodiments of such systems and methods are possible. For example, 5G core network standards may allow an application server (e.g., 320) to connect to a user plane function (UPF) 1910 and/or network exposure function (NEF) 1920 and to send request for a specified QoS with a UE. However, such options may not be widely available or effective. For example, there may be no standard Protocol/Message/Context between server and UPF/NEF in 5G. Thus, interoperability issues may complicate deployment and scalability.

Shown centrally is a UE (e.g., the UE 106 in FIGS. 1-4), which may be connected to a network, e.g., via a radio access network (RAN) 702 as shown. The RAN 702 may be considered a component of the network. Among performing other functions, the RAN may provide connectivity between the UE 106 and a core network of the cellular network. The UE 106 may be camped on a base station (e.g., the base station 102 in FIG. 1, 2, 3, or 5) that constitutes part of the RAN 702. The UE 106 may communicate with the RAN, e.g., the base station, using a variety of radio access technologies (RATs). For example, the UE 106 may communicate with the RAN using the LTE RAT and/or an NR RAT. In the case of some NR embodiments, the RAN may include a gNB 102 (e.g., a BS 102). The BS 102 may be connected to the UPF 1910, NEF 1920, and core network 100. The connection between the UE 106 and the RAN 702 (and the network generally) may include a default flow 1940 which may have default QoS characteristics.

Similar to FIG. 16, FIG. 19 illustrates simplified relationships between various UE entities (e.g., components of UE 106) and external entities. As discussed above, certain applications that perform wireless communications may require or benefit from a certain level of communication service quality, or QoS. The app server 320 may transmit an application message 1601 to the app 710 indicating to the app 710 to request an enhanced QoS pipeline between the UE 106 and the app server 320. Based on the application message 1601 and/or other factors (e.g., an autonomous determination), the app 710 may indicate a request 1602 for an enhanced QoS pipeline to QoS gear 712. In response to the request 1602 from app 710 for an enhanced QoS, the QoS gear 712 may communicate 1603 with application entitlement server (AES) 714 (e.g., via baseband processor 708 and RAN 702, although for clarity, illustrated as a direct connection via an AES entity 1650 executing on the UE). This communication 1603 may be referred to as entitlement control and may include any number of messages. If the application request 1602 is considered appropriate, the QoS gear 712 may determine to grant the request.

Accordingly, the QoS gear may transmit, to NEF 1920 (e.g., via baseband processor 708 and RAN 702, although for clarity, illustrated as a direct connection) a request for an enhanced QoS pipeline 1604. The request 1604 may be transmitted using Mobile RSVP, HTTP, HTTPS, and/or SCTP, among various possibilities and may include a 3GPP QoS Object or other object, information element, etc.

The NEF 1920 (e.g., in coordination with the UPF 1910 and/or other entities) may determine to establish an enhanced QoS flow to provide the enhanced QoS pipeline. Accordingly, the RAN 702 and UE 106 may establish an enhanced QoS flow 350 for app 710. This enhanced flow, dedicated to application traffic between the UE 106 and app server 320, may be used instead of or in addition to one or more default flows or other flows. Further, the QoS flow may be an end-to-end flow, extending from the UE, through the RAN 702 and UPF 1910, to the app server 320. The network traffic prioritization, resource reservation control, and other mechanisms and parameters for each of these links may be configured to achieve a targeted level of communication performance, or QoS for the enhanced QoS flow 350, dedicated to the traffic of App 710. The NEF 1920 may send a response 1605 to the UE 106 indicating that the request has been granted and/or indicating the establishment of the dedicated bearer. The response 1605 may be transmitted using Mobile RSVP, HTTP, HTTPS, and/or SCTP, among various possibilities.

FIG. 20 is similar to FIG. 17 and is a communication flow diagram, illustrating messages between various elements in order to implement aspects of the method of FIG. 6, according to some embodiments. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may set up a connection with a network, e.g., via RAN 702 (1702), according to some embodiments. The UE 106 and network may establish a default bearer and the UPF 1910 and/or NEF 1920 may transmit a notification of the attachment to the UE. The notification may be illustrated as "empty QoS" to indicate that no enhanced QoS is established at this time.

The app 710 executing on the UE 106 may provide a QoS request, e.g., specifying a desired QoS, to a QoS entity of the UE 106 (e.g., using the QoS API) (1704), according to some embodiments. In response to the QoS request, the UE 106 may verify the QoS profile of the app 710 with an AES server 714 (1706). In response to successful verification, the UE 106 may transmit a QoS request message to the UPF 1910 and/or NEF 1920 (1708). The QoS request message may specify a desired QoS for communication between the UE 106 and the app server 320 for application traffic of the app 710.

The UPF 1910 and/or NEF 1920 may transmit a confirmation (1710) to the UE 106 and may transmit a QoS request (e.g., in response to the request 1708 from the UE) to the 5G core network 100 (1712), according to some embodiments. The QoS request to the core network may specify the desired QoS characteristics for a dedicated pipeline (e.g., end-to-end flow) for application traffic between the UE 106 and app server 320. The elements of the core network may check the application profile, and, in response to a successful verification, acknowledge the request (1714) and instruct the UPF 1910 and/or NEF 1920 (and in turn the RAN) to establish the enhanced QoS flow 1950 for the application data flow or flows between the UE 106 and the App server 320. The enhanced QoS flow 1950 may be a dedicated end-to-end pipeline from the UE 106 to the app server 320, e.g., including any component connections (e.g., UE 106 to base station 102, base station 102 to gateway (e.g., UPF 1910, NEF 1920, or other elements), gateway to any intermediate network elements, intermediate network elements to app server 320, etc.). Each component connection of the dedicated end-to-end pipeline may be configured so that the entire end-to-end pipeline provides the desired QoS. For example, each of the component connections may be configured to meet or exceed the desired QoS. The enhanced QoS flow 1950 may have any desired QoS characteristics. For example, the enhanced QoS flow 1950 may have a guaranteed bit rate (GBR), e.g., as in the illustrated example. After the enhanced QoS flow 1950 is established, the core network may transmit a notification indicating the enhanced QoS to the UE 106 (1716). The UE 106 may in turn confirm the QoS to the app 710 (1718). The application 710 and the app server 320 may exchange data using the enhanced QoS flow 1950.

FIG. 21 is similar to FIG. 18 and continues from FIG. 20, and illustrates the release of the dedicated bearer. As shown, an enhanced QoS flow 1950 may be established between a UE 106 and UPF 1910 and/or NEF 1920 and may extend to app server 320 (not shown). The App 710 may send a QoS release message to the UE 106 (1802). In response, the UE 106 may send a QoS message to the UPF 1910 and/or NEF 1920 indicating to release the enhanced QoS flow 1950 (1804). The message may include an empty QoS specification, e.g., to indicate that a default (or other) flow may be used and that the enhanced QoS flow 1950 is no longer desired. The UPF 1910 and/or NEF 1920 may send a confirmation of the request to the UE 106 (1806). Further, the UPF 1910 and/or NEF 1920 may send a request or notice to the core network 100 of the QoS message (1808). The core network 100 may acknowledge the request and/or instruct the UPF 1910 and/or NEF 1920 to release the enhanced QoS flow 1950 (1810). The UPF 1910 and/or NEF 1920 may transmit a notification to the UE 106 that the enhanced QoS flow 1950 is released (1812) and may release the enhanced QoS flow 1950. The UE 106 may (e.g., using the QoS API) provide a confirmation to the App 710 that the enhanced QoS flow 1950 is released (1814).

It will be appreciated that the release process of FIG. 21 may be followed by establishing a new dedicated pipeline, e.g., with different (or possibly the same) QoS characteristics. For example, the QoS request 1802 may specify a change in the desired QoS. Accordingly, the initial dedicated pipeline may be released as shown and a new pipeline may be established with the changed QoS. For example, such a replacement pipeline may be established using messaging as described above with respect to 1708-1718.

Alternatively, a similar sequence of messages may be used to modify the QoS of the first pipeline (e.g., without releasing the first pipeline and replacing it with a new pipeline). For example, the QoS request message of 1708 may be used to request a modified QoS of the first pipeline.

Exemplary embodiments are described below.

In a first set of embodiments, a user equipment device (UE) may comprise: at least one antenna for performing wireless communications; a radio coupled to the at least one antenna; and a processor coupled to the radio and configured to cause the UE to: wirelessly communicate with a network; execute an application; receive a quality of service (QoS) request from the application; determine to grant the QoS request; transmit, in response to the determination, a message to the network requesting an enhanced QoS pipeline for the application; establish the enhanced QoS pipeline for traffic of the application with a server associated with the application; and exchange, with the server, data associated with the application using the enhanced QoS pipeline for traffic of the application.

In some embodiments, the message to the network includes a 3GPP QoS Object.

In some embodiments, the message to the network includes a traffic flow template.

In some embodiments, the message to the network indicates QoS characteristics requested for the enhanced QoS pipeline.

In some embodiments, the processor may be further configured to cause the UE to: receive a second QoS request from the application; and transmit, to the network, a request to modify QoS characteristics of the enhanced QoS pipeline in response to the second QoS request.

In some embodiments, the enhanced QoS pipeline is an end-to-end bearer.

In some embodiments, the enhanced QoS pipeline is an end-to-end flow.

In a second set of embodiments, an apparatus for operating a user equipment device (UE), the apparatus may comprise a processor configured to cause the UE to: establish communication with a network; receive, from an application executing on the UE, a request for a dedicated end-to-end pipeline with an application server; verify the application; transmit, based on the verification, a request to the network for the dedicated end-to-end pipeline; establish, with the network, the dedicated end-to-end pipeline; and exchange, with the application server and using the dedicated end-to-end pipeline, application data of the application.

In some embodiments, the processor is further configured to cause the UE to: receive, from the application, an indication to release the dedicated end-to-end pipeline; transmit, to the network, a request to release the dedicated end-to-end pipeline; receive, from the network, a notification to release the dedicated end-to-end pipeline.

In some embodiments, the indication to release the dedicated end-to-end pipeline further indicates desired quality of service (QoS) for a replacement dedicated end-to-end pipeline, wherein the processor is further configured to cause the UE to establish the replacement dedicated end-to-end pipeline with the desired QoS.

In some embodiments, the desired QoS is different than an initial QoS of the dedicated end-to-end pipeline.

In some embodiments, the request for the dedicated end-to-end pipeline uses a QoS application programming interface.

In some embodiments, the request to the network for the dedicated end-to-end pipeline is transmitted using an extended Resource ReSerVation Protocol (RSVP).

In some embodiments, the request to the network for the dedicated end-to-end pipeline is transmitted using one of: HyperText Transfer Protocol (HTTP); HTTP Secure (HTTPs); or stream control transfer protocol (SCTP).

In some embodiments, the processor is further configured to cause the UE to measure round trip latency between the UE and the network, wherein to measure round trip latency includes: transmitting, to the network, a first echo message; and receiving, from the network, a second echo message in response to the first echo message.

In a third set of embodiments, a method for operating a network element, may include: at the network element: establishing cellular communications with a user equipment device (UE), including providing a default quality of service (QoS) to the UE; receiving, from the UE, a QoS request message specifying a desired QoS for communication with an application server associated with an application executing on the UE; transmitting, to a core network, a second QoS request based on the QoS request message; receiving, from the core network, an acknowledgement of the second QoS request; establishing, based on the acknowledgement, a dedicated pipeline between the application server and the UE with the desired QoS, wherein to establish the dedicated pipeline includes: establishing a connection with the UE with the desired QoS; and establishing a connection with the application server with the desired QoS.

In some embodiments, the second QoS request specifies the desired QoS.

In some embodiments, the QoS request message includes a packet filter, the method further comprising: routing a plurality of packets on the dedicated pipeline based on the packet filter.

In some embodiments, the method further includes: receiving, from the UE, a ResvEcho message; and transmitting, to the UE, a ResvEchoRes message in response to the ResvEcho message.

In some embodiments, the method further includes: receiving, from the UE, a message indicating to release the dedicated pipeline; and releasing the dedicated pipeline in response to the message.

In some embodiments, a user equipment (UE) may comprise: at least one antenna for performing wireless communications; a radio coupled to the at least one antenna; and a processing element coupled to the radio and configured to cause the UE 106 to: wirelessly communicate with a network; execute an application; receive a quality of service (QoS) request from the application; determine to grant the QoS request; transmit, in response to the determination, a message to the network requesting a dedicated bearer for the application; establish the dedicated bearer for the application; and exchange, with the network, data associated with the application using the dedicated bearer for the application.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna for performing wireless communications;
   a radio coupled to the at least one antenna; and
   a processor coupled to the radio and configured to cause the UE to:

wirelessly communicate with a network;
execute an application;
receive a quality of service (QoS) request from the application for enhanced QoS with a server associated with the application;
transmit, in response to the request, a QoS request message to a user plane function (UPF) of the network requesting an enhanced QoS pipeline for the application with the server associated with the application;
receive, from the UPF, a QoS confirm message;
establish the enhanced QoS pipeline, wherein the enhanced QoS pipeline connects the UE and the server associated with the application via at least one intermediate connection; and
exchange, with the server, data associated with the application using the enhanced QoS pipeline.

2. The UE of claim 1,
wherein the QoS request message to the UPF includes a 3GPP QoS Object.

3. The UE of claim 1,
wherein the QoS request message to the UPF includes a traffic flow template.

4. The UE of claim 1,
wherein the QoS request message to the UPF indicates QoS characteristics requested for the enhanced QoS pipeline.

5. The UE of claim 1,
wherein the processor is further configured to cause the UE to:
receive a second QoS request from the application; and
transmit, to the UPF, a request to modify QoS characteristics of the enhanced QoS pipeline in response to the second QoS request.

6. The UE of claim 1,
wherein the enhanced QoS pipeline is an end-to-end bearer.

7. The UE of claim 1,
wherein the enhanced QoS pipeline is an end-to-end flow.

8. An apparatus, comprising:
a processor configured to cause a user equipment (UE) to:
establish communication with a network;
receive, from an application executing on the UE, a request for a dedicated end-to-end pipeline with an application server;
verify the application;
transmit, based on the verification, a request to a user plane function (UPF) of the network for the dedicated end-to-end pipeline;
receive, from the UPF, a confirmation message;
establish, with the network, the dedicated end-to-end pipeline; and
exchange, with the application server and using the dedicated end-to-end pipeline, application data of the application.

9. The apparatus of claim 8,
wherein the processor is further configured to cause the UE to:
receive, from the application, an indication to release the dedicated end-to-end pipeline;
transmit, to the UPF, a request to release the dedicated end-to-end pipeline; and
receive, from the UPF, a notification to release the dedicated end-to-end pipeline.

10. The apparatus of claim 9,
wherein the indication to release the dedicated end-to-end pipeline further indicates desired quality of service (QoS) for a replacement dedicated end-to-end pipeline,
wherein the processor is further configured to cause the UE to establish the replacement dedicated end-to-end pipeline with the desired QoS.

11. The apparatus of claim 10,
wherein the desired QoS is different than an initial QoS of the dedicated end-to-end pipeline.

12. The apparatus of claim 8,
wherein the request for the dedicated end-to-end pipeline uses a QoS application programming interface.

13. The apparatus of claim 8,
wherein the request to the UPF for the dedicated end-to-end pipeline is transmitted using an extended Resource ReSerVation Protocol (RSVP).

14. The apparatus of claim 8,
wherein the request to the UPF for the dedicated end-to-end pipeline is transmitted using one of:
HyperText Transfer Protocol (HTTP);
HTTP Secure (HTTPs); or
stream control transfer protocol (SCTP).

15. The apparatus of claim 8,
wherein the processor is further configured to cause the UE to measure round trip latency between the UE and the network, wherein to measure round trip latency includes:
transmitting, to the network, a first echo message; and
receiving, from the network, a second echo message in response to the first echo message.

16. A method, comprising:
at a network element:
establishing cellular communications with a user equipment device (UE), including providing a default quality of service (QoS) to the UE;
receiving, from the UE, a QoS request message specifying a desired QoS for communication with an application server associated with an application executing on the UE;
transmitting, to a core network, a second QoS request based on the QoS request message;
receiving, from the core network, an acknowledgement of the second QoS request;
transmitting, to the UE, a QoS confirm message;
establishing, based on the acknowledgement, a dedicated pipeline between the application server and the UE with the desired QoS, wherein to establish the dedicated pipeline includes:
establishing a connection with the UE with the desired QoS; and
establishing a connection with the application server with the desired QoS.

17. The method of claim 16,
wherein the second QoS request specifies the desired QoS.

18. The method of claim 16,
wherein the QoS request message includes a packet filter, the method further comprising:
routing a plurality of packets on the dedicated pipeline based on the packet filter.

19. The method of claim 16, the method further comprising:
receiving, from the UE, a ResvEcho message; and
transmitting, to the UE, a ResvEchoRes message in response to the ResvEcho message.

20. The method of claim 16, the method further comprising:
- receiving, from the UE, a message indicating to release the dedicated pipeline; and
- releasing the dedicated pipeline in response to the message.

\* \* \* \* \*